United States Patent
Talbot et al.

(10) Patent No.: US 7,424,466 B2
(45) Date of Patent: Sep. 9, 2008

(54) GENERAL PURPOSE FUSION ENGINE

(75) Inventors: Patrick J. Talbot, Colorado Springs, CO (US); Dennis R. Ellis, Colorado Springs, CO (US)

(73) Assignee: Northrop Grumman Corporation, Los Angeles, CA (US)

( * ) Notice: Subject to any disclaimer, the term of this patent is extended or adjusted under 35 U.S.C. 154(b) by 1119 days.

(21) Appl. No.: 10/201,882

(22) Filed: Jul. 24, 2002

(65) Prior Publication Data

US 2004/0019575 A1    Jan. 29, 2004

(51) Int. Cl.
*G06F 17/00*    (2006.01)
(52) U.S. Cl. .............................. 706/46; 706/50; 706/52
(58) Field of Classification Search .................... 706/46
See application file for complete search history.

(56) References Cited

U.S. PATENT DOCUMENTS

| | | | | |
|---|---|---|---|---|
| 4,839,823 | A * | 6/1989 | Matsumoto .................. | 706/52 |
| 5,696,884 | A * | 12/1997 | Heckerman et al. ........... | 706/61 |
| 5,715,374 | A * | 2/1998 | Heckerman et al. ........... | 706/46 |
| 5,802,256 | A * | 9/1998 | Heckerman et al. ........... | 706/59 |
| 5,963,653 | A * | 10/1999 | McNary et al. ............. | 382/103 |
| 6,125,339 | A * | 9/2000 | Reiser et al. ................ | 702/181 |
| 6,154,736 | A * | 11/2000 | Chickering et al. .......... | 706/59 |
| 6,304,833 | B1 * | 10/2001 | Ferkinhoff et al. ............. | 703/2 |
| 6,471,521 | B1 * | 10/2002 | Dornbush et al. ........... | 434/322 |
| 6,757,668 | B1 * | 6/2004 | Goebel et al. ................ | 706/59 |
| 6,920,439 | B1 * | 7/2005 | Love ........................... | 706/20 |
| 6,951,008 | B2 * | 9/2005 | Quaile ......................... | 706/54 |
| 7,184,994 | B2 * | 2/2007 | Bella et al. .................... | 706/49 |
| 2001/0011260 | A1 * | 8/2001 | Skaanning et al. ........... | 706/46 |
| 2005/0033710 | A1 * | 2/2005 | Cochran et al. ............... | 706/45 |

OTHER PUBLICATIONS

"Gertis: A Dempster-Shafer approach to diagnosing hierarchical hypotheses", John Yen, Artificial Intelligence and Language Processing, May 1989, vol. 32, No. 5, Communications of the ACM.*

"A prototype Belief Network-based Expert System Shell", S. Wang, M. Valtorta, 1990, ACM.*

"Decision Making Under Uncertainty", J. Pearl, ACM Computing Surveys, vol. 28, No. 1, Mar. 1996.*

"An Overview of Decision Networks and Organizations", A. Pete, K. R. Pattipati, IEEE Transactions on Systems, Man, and Cybernetics, vol. 28, No. 2, May 1998.*

(Continued)

*Primary Examiner*—David Vincent
*Assistant Examiner*—Mai T Tran
(74) *Attorney, Agent, or Firm*—Tarolli, Sundheim, Covell & Tummino LLP

(57) ABSTRACT

Systems and methods are provided for fusing new evidence and displaying node parameters of a decision network. The decision network can be a belief network, such as a Dempster-Shafer belief network. The Dempster-Shafer belief network includes node parameters that conform to the Dempster-Shafer combination rule, which is based on an evidential interval: the sum of a belief value, a disbelief value and an unknown value is equal to one. A user override is provided to allow a user to override node parameters associated with a hypothesis or outcome and the decision network self-adjusts the appropriate link values or learned to instantiate the override. The back-propagation algorithm is used to adjust the links.

34 Claims, 18 Drawing Sheets

OTHER PUBLICATIONS

"An Alternative to Outward Propagation for Dempster-Shafer Belief Functions", N. Lehmann, R. Haenni, Institute of Informatics, University of Fribourg.*

"Application of Dempster-Shafer theory in condition monitoring applications: A case study", C. R. Parikh, M. J. Pont, N. B. Jones, Pattern Recognition Letters, 2001.*

"Simulating "Fog of War" in Military Decision-Making", Pat Talbot, International Conference on Industrial & Engineering Applications of Artificial Intelligence & Expert Systems (IEA/AIE 2000), New Orleans, Louisiana, Jul. 2000, pp. 1-8.*

"Military Decision Aids—A Robust Decision-centered Approach", Patrick J. Talbot, Technology Review Journal, Spring/Summer 2001, pp. 83-96.*

"Computational Intelligence for Decision Support", Zhengxin Chen, CRC Press, 2000, chapter 12.3.5-12.4.1.1.*

"Evidential Reasoning Using DELIEF", D. Zarley, Y. T. Hsia, G. Shafer, Proceedings of the National Conference of Artificial Intelligence, 1988, pp. 619-623.*

"The Dempster-Shafer Theory of Evidential Reasoning", R. Stein, AI Expert, Aug. 1993, pp. 3/8-8/8.*

"An Expert System Approach to Audit Planning and Evaluation in the Belief-Function Framework", R. P. Srivastava, S. K. Dutta, R. W. Johns, International Journal of Intelligent Systems in Accounting, Finance and Management, vol. 5, No. 3, 1996, pp. 165-183.*

* cited by examiner

GENERAL PURPOSE FUSION ENGINE

TECHNICAL FIELD

The present invention relates to artificial intelligence and, more particularly, to the fusion of new evidence with current node parameters in a decision network.

BACKGROUND OF THE INVENTION

There are different approaches for constructing decision networks, such as decision trees or decision graphs, namely, a knowledge-based approach and a data-based approach. Using the knowledge-based approach, a person (known as a knowledge engineer) interviews an expert in a given field to obtain the knowledge of the expert about the field of expertise of the expert. The knowledge engineer and expert first determine the distinctions of the subject matter that are important for decision making in the field of the expert. These distinctions correspond to the variables in the domain of interest, referred to as the hypothesis. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the conditional probability distribution.

In the data-based approach, the knowledge engineer and the expert first determine the variables of the domain. Next, data is accumulated for those variables, and an algorithm is applied that creates one or more decision graphs from this data. The accumulated data comes from real world instances of the domain or hypothesis. That is, real world instances of decision making in a given field.

Conventional decision techniques which combine knowledge-based and data-based approaches include neural networks, Bayesian Networks, Rough Set Theory, and belief networks, such as a Dempster-Shafer belief network. The Bayesian networks provide intuitive results, but are better suited to causal reasoning. Rough sets differentiate between what is certain and what is possible. Dempster-Shafer belief network is an evidential reasoning approach that relies on the Dempster-Shafer Combination Rule, which differentiates ignorance and disbelief (sometimes described as "skeptical" processing), and performs conflict resolution.

Decision makers often find it difficult to mentally combine evidence since the human tendency is to postpone risky decisions when data is incomplete, jump to conclusions, or refuse to consider conflicting data. Those versed in classical (frequentist) statistics realize that in situations where evidence is sparse, a data fusion engine is necessary. Data fusion is a difficult, unsolved problem. A contributing factor to the challenge is that the data fusion problem means many things to many people. Fusion of evidence provides a focused solution in cases where a decision maker is faced with discrete bits of information that are inherently uncertain. There are many types of data fusion, and the difference between fusion and correlation is tenuous. Therefore, improvements in fusion mechanisms and techniques are desirable.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later. A component as described in this application can include functionality performed by software, hardware or a combination of hardware and software.

The present invention relates to systems and methods for fusing evidence and displaying node parameters in a decision network. In certain aspects of the invention, the decision network is a belief network, such as a Dempster-Shafer belief network. The Dempster-Shafer belief network includes node parameters that conform to the Dempster-Shafer combination rule, which is based on an evidential interval: the sum of a belief value, a disbelief value and an unknown value is equal to one. An aspect of the present invention allows a user to modify the belief or disbelief associated with a hypothesis or outcome and the belief network self-adjusts, or learns, the appropriate link values to instantiate the override. The back-propagation algorithm is used to adjust the links. A user can select the number of layers that the back propagation algorithm will execute.

In one aspect of the present invention, systems and methods are provided for comparing parameters of decision networks. A loader loads a first decision network that is executed and provided to a network overlay. The loader then loads a second decision network that is executed and provided to the network overlay. The network overlay compares node parameters of the first network and the second network. The first network and the second network can be belief networks, and the associated comparison can be a ratio of belief and/or disbelief values of given nodes.

In another aspect of the present invention, systems and methods are provided for determining an inverse related to an amount of additional evidence necessary for reaching a decision threshold. The inverse is evaluated by the relationship that an evidence matrix fused with an inverse matrix produces an identity matrix. The inverse matrix can then be solved. The evidence matrix, the inverse matrix and the identity matrix can be a triad of parameter values associated with a belief value, a disbelief value and an unknown value of at least one node of a Dempster-Shafer belief network. The inverse can be associated with a linguistic term and provided to a display.

In yet another aspect of the invention, a fog component is provided to perturb new evidence received from an evidence source prior to fusing the new evidence with current node parameters of a decision network. The fog component perturbs data and human cognitive performance and integrates the perturbed data into a decision network. A graphical user interface is provided that allows a user to specify the frequency and severity associated with data and human perturbation variables. The fog component can be enabled and disabled. A temporal screen is provided to display node parameter values over time of a selected node with and without fog.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to systems and methods for fusing evidence and displaying node parameters in a decision network. The present invention has broad applicability to risky decision making in circumstances where evidence is uncertain, incomplete, possibly conflicting, and arrives asynchronously over time. In certain aspects of the invention, the decision network is a belief network, such as a Dempster-Shafer belief network. The Dempster-Shafer belief network includes node parameters that conform to the Dempster-Shafer combination rule, which is based on an evidential interval: the sum of a belief value, a disbelief value and an unknown value is equal to one. The Dempster-Shafer Combination Rule for fusion of evidence provides for nodes in a network represented as evidential intervals with values from the set of real numbers ($0<=n<=1$). Three parameters specify each node: "belief" (B), "unknown" (U) and "disbelief" (D). The unknown parameter is computed as: $U=1-B-D$. The Dempster-Shafer Combination Rule is symmetric, bounded, commutative and associative.

Certain examples of the present invention are illustrated with respect to military applications and weather applications. However, it is to be appreciated that the present invention can be employed in a plurality of applications. Additionally, the effects of weather on certain military application can be implemented in accordance with one or more aspects of the present invention. For example, weather is considered in the following applications: Combat Assessment, Weather Prediction Impacts, Kill Chain Belief Network, Space Weather Fusion, Foreign Missile Launch Assessment, and Fog-of-War Effects on Foreign Missile Launch Assessment. Additional application would be apparent to those skilled in the art.

An aspect of the present invention allows a user to override the belief or disbelief associated with a hypothesis or outcome and the belief network self-adjusts the appropriate link values or learns to instantiate the override. The back-propagation algorithm is used to adjust the links. In addition, the belief network includes explanations of how outcomes were obtained, which is important in risky decision making environments. The override is particularly useful because things do not always work out according to plan. The operator adjusts node values to correspond to his real sense of belief and disbelief (not all evidence is expected to be resident in the computer) in hypotheses and conclusions. The back-propagation algorithm adjusts link values to show the corresponding influence that evidence and tasks have had on accomplishing objectives.

Figure 1:
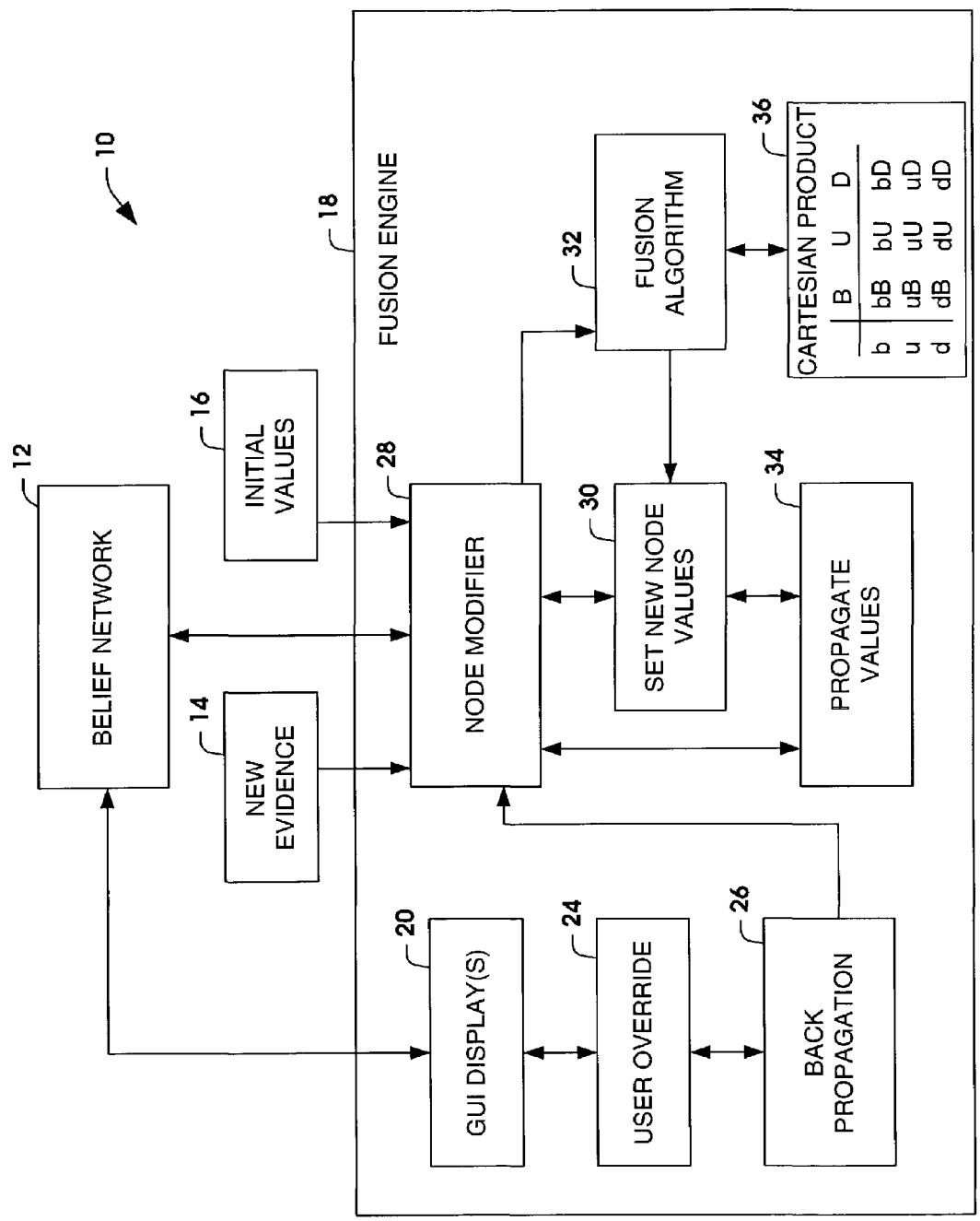
FIG. 1 illustrates a block diagram of a system for fusing evidence into a belief network in accordance with an aspect of the present invention.

FIG. 1 illustrates a system 10 for fusing evidence into a belief network 12 in accordance with the present invention. The system 10 includes a fusion engine 18 that initializes the belief network 12 in addition to providing a mechanism for fusing new evidence received from one or more evidence sources into one or more nodes of the belief network. A node represents a particular hypothesis of the belief network, which can depend on evidence and/or depend on parameters of one or more other nodes. The belief network 12 includes a plurality of nodes provided with parameters conforming to the Dempster-Shafer combination rule. The Dempster-Shafer Combination rule is illustrated in EQ. 1 as follows:

$$\text{Belief}(B)+\text{Disbelief}(D)+\text{Unknown}(U)=1 \qquad \text{EQ. 1}$$

where B and D are basic probability assignments based on a belief value and a disbelief value, respectively, of a particular hypothesis and the remaining probability can be calculated as the unknown value of the particular hypothesis. Initial values 16 are provided to a node modifier 28, which assigns the initial node parameters, initializes link values, sets the learning rates and provides linguistic explanations to the belief network 12. The initial node parameters can include for example, initial belief and disbelief values of input nodes (e.g., top layer of the belief network). In accordance with the Dempster-Shafer rule, initial belief and disbelief values can be zero with the unknown being equal to one, such that a particular hypothesis is unknown. This is in contradiction to belief networks such as Bayesian, which require an initial probability value.

The unknown is then computed and the new node values are instantiated by a set new node values component 30 based on the fusion algorithm 32. A component can be implemented as a software algorithm and/or hardware. The new node values are then propagated to nodes in additional layers by a propagate values component 34, and provided back to the node modifier 28. The node modifier 28 then provides the node parameter values in addition to any other information provided by the initial values 16 to the belief network 12. The belief network 12 can then be displayed on one or more graphical user interface (GUI) displays 20.

Once the belief network 12 is initialized, the fusion engine 18 can update the belief network 12 with new evidence 14 using the fusion engine 18. New evidence 14 from one or more evidence sources is provided that includes belief (b) and disbelief (d) values in a particular hypothesis. The unknown can then be evaluated based on Equation 1 above. The new evidence 14 of belief (b) and disbelief (d) and calculated unknown (u) can then be fused with the current Belief (B), Disbelief (D) and Unknown (U) to provide new modified parameters associated with a particular hypothesis or node. The evidence is fused by a fusion algorithm 32 according to the Dempster-Shafer combination rule. The fusion algorithm 32 includes evaluating a Cartesian Product 36 of the new evidence with the current evidence to provide newly updated evidence. The Cartesian product is used in the following equations:

$$MB=(bB+bU+uB)/N \quad \text{EQ. 2}$$

$$MD=(dD+dU+uD)/N \quad \text{EQ. 3}$$

$$N=1-dB-bD \quad \text{EQ. 4}$$

where MB is the modified belief, MD is the modified disbelief and N is the normalization equation that represents conflicting evidence that is normalized out of the modified belief and modified disbelief. The updated node parameters are then propagated to nodes in lower layers of the belief network 12 by a propagate values component 34 and provided back to the node modifier 28. The node modifier 28 then provides the updated node parameter values to the belief network 12. The belief network 12 can then be displayed on one or more GUI displays 20.

In accordance with an aspect of the present invention, a user override 24 is provided that allows a user to modify beliefs and disbeliefs of one or more nodes of the belief network 12. The user override 24 gives the user the ability to modify beliefs and disbeliefs at any layer within the belief network. A back propagation routine 26 then propagates the modifications at one or more nodes of a selected layer backward through the network to iteratively modify upper layers to facilitate the mathematical correctness of the belief network 12. The user override 24 allows a user to change or override beliefs and disbeliefs of nodes and back propagate these modifications upward through the network 12. A user can also specify the number of layers that the backward propagation 26 is to execute, such that hypothesis believed to be correct can remain intact. Link values can then be modified to facilitate mathematical correctness.

Once the nodes are modified by the user override 24 and the network is back propagated using the back propagation routine 26, the new node values are provided to the node modifier 28. The node modifier 28 can then provide the node values to the set new node values component 30 to update the modified values. The modified values can then be provided to the propagate values routine 34 which performs a forward propagation to modify the nodes below the layers of the modified network to facilitate mathematical correctness of the belief network 12. The updated node values are provided back to the node modifier 28, which provide the updated node parameter values to the belief network 12. If the user selects to add evidence to current parameters of a node, the parameters are fused with the current parameters using the fusion algorithm, such as the fusion algorithm 32 described above.

Figure 2:
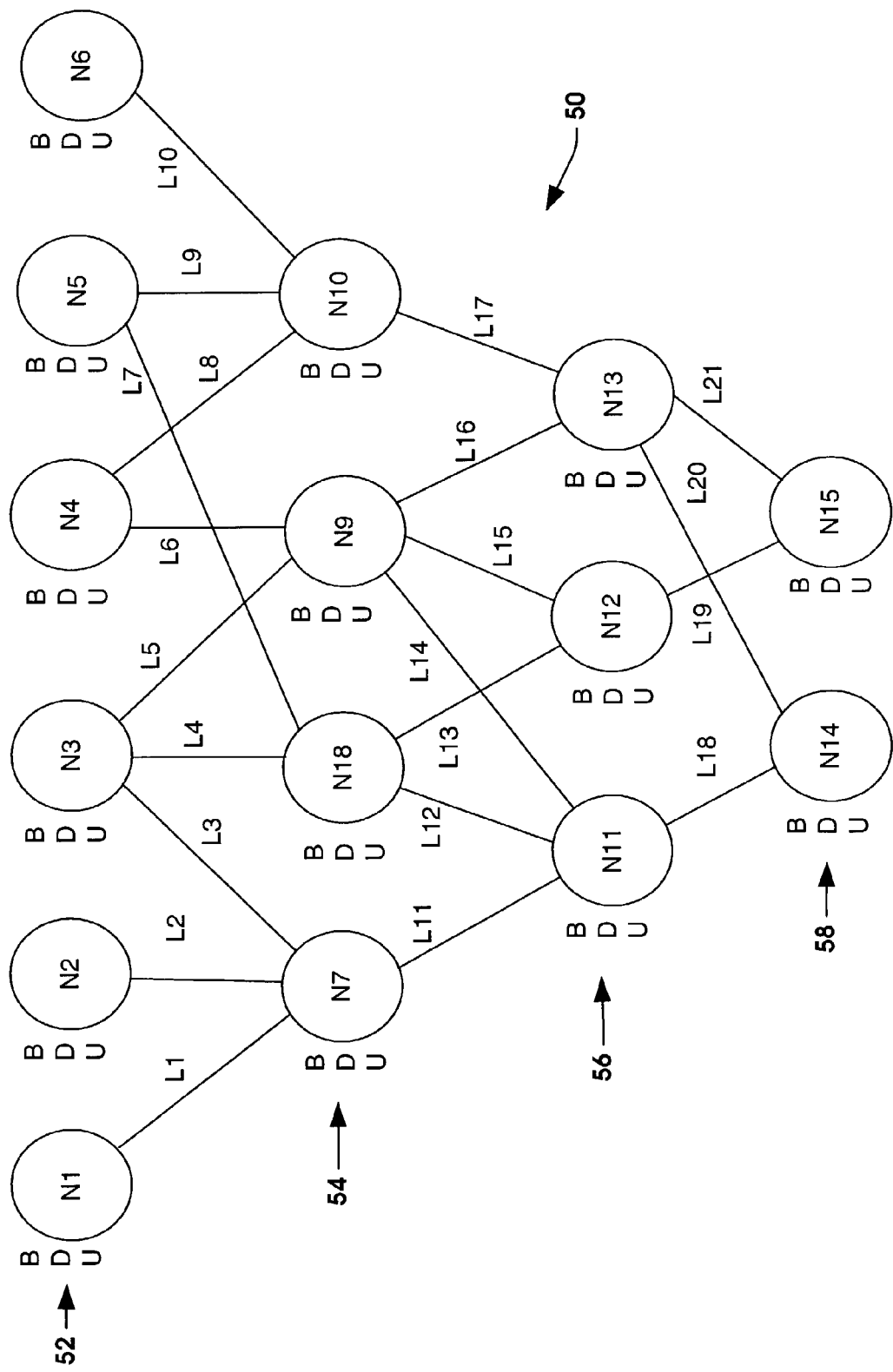
FIG. 2 illustrates a representation of a belief network in accordance with an aspect of the present invention.

FIG. 2 illustrates a representation of a belief network in accordance with an aspect of the present invention. The belief network 50 includes a top layer 52, a first intermediate layer 54, a second intermediate layer 56 and a bottom layer 58. The top layer 52 includes nodes N1-N6 linked to the first intermediate or hypothesis layer 54 by links or multipliers L1-L10. The first intermediate layer 54 includes nodes N7-N10 linked to the second intermediate layer 54 by links or multipliers L11-L17. The second intermediate layer 56 includes nodes N11-N13 linked to the bottom layer 58 by links or multipliers L18-L21. Each node represents a given variable and hypothesis associated with that variable that can effect the variable and hypothesis of other nodes in lower layers mathematically. Associated with each of the nodes N1-N15 is three parameters, which are a belief parameter B, a disbelief parameter D, and an unknown parameter U. The parameters B, D and U conform to the Dempster-Shafer evidential interval such that the parameter B, D and U add up to one for each node N1-N15.

The links represent multipliers or weights of a given parameter on a lower node. For example, the belief of node N7 of the first intermediate layer 54 depends on the belief of nodes N1, N2 and N3 each multiplied by its respective link value L1, L2 and L3. Additionally, the disbelief of node N7 of the first intermediate layer 54 depends on the disbelief of nodes N1, N2 and N3 each multiplied by its respective link value L1, L2 and L3. The unknown is computed based on EQ. 1. The belief and disbelief of node N7 then propagate to N11 through link L11, which is combined with the belief and disbelief of N18 multiplied by link L12 and the belief and disbelief of node N9 multiplied by link L14. The belief and disbelief of node N11 then propagate to node N14 through link L18 which is combined with the belief and disbelief of N13 multiplied by link L20. The unknowns of each row can be evaluated using EQ 1. Similar propagation occurs to provide the beliefs, the disbeliefs and unknowns of the node N15.

New evidence is provided to the top or input source row and propagated through the network down to the bottom or assessment row 58 using a fusion algorithm as discussed in FIG. 1. A user can use the bottom or assessment row to make a final decision based on the parameter values at node N14 and N15. In accordance with the present invention, a user can modify parameters at nodes in any of the network layers. The modified parameters are then back propagated through upper layers of the network. A user can define how many layers that the back propagation will propagate. The network is then downwardly propagated to adjust the network to be mathematically correct, which can include modification of the nodes. The present invention allows a user to override evidence or add evidence to any of the nodes. Additionally, a user can modify any of the link values. The modification to the node parameter values and the link values are subject to constraints within the mathematical model.

Figure 3:
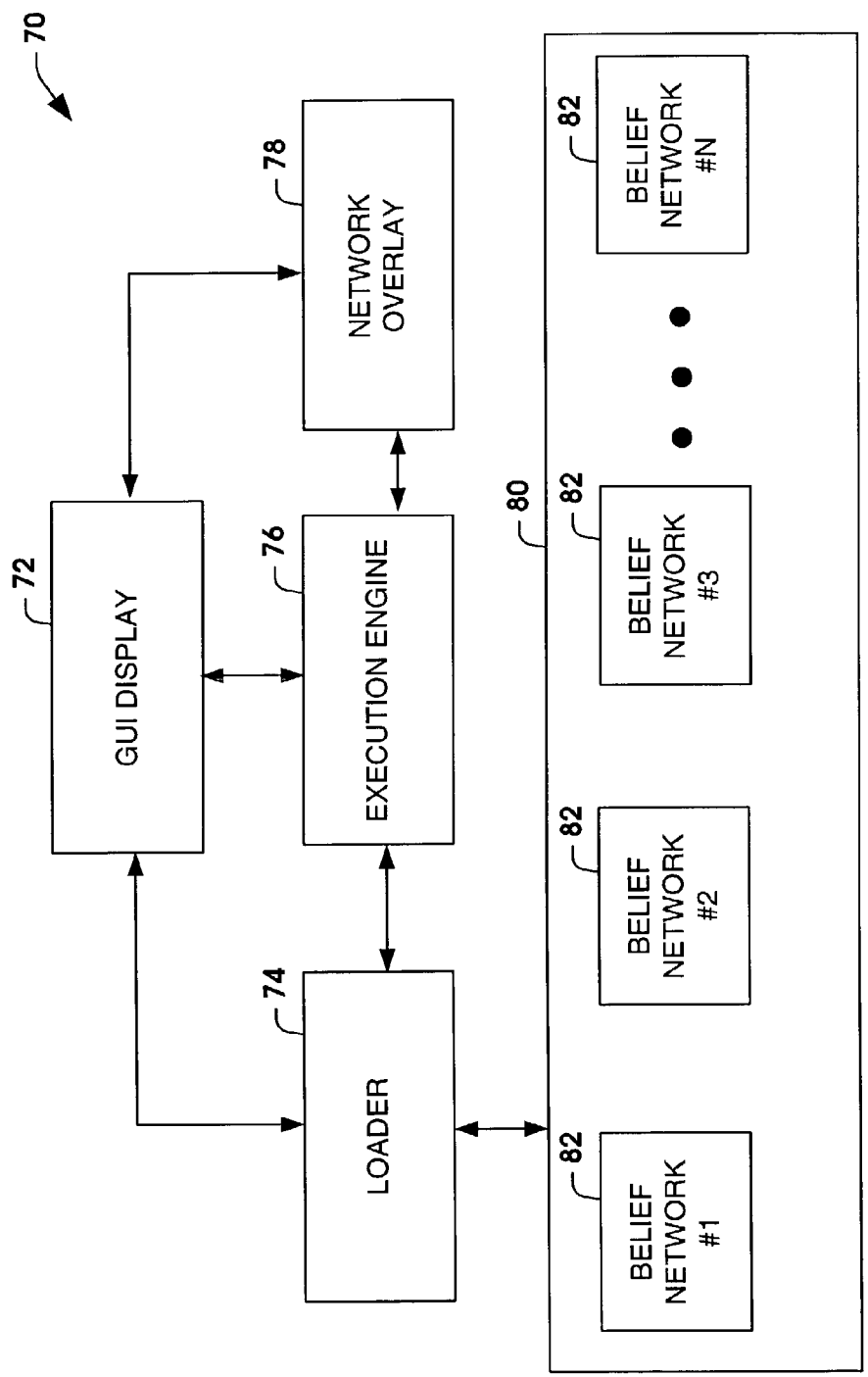
FIG. 3 illustrates a block diagram of a system for overlaying networks in accordance with an aspect of the present invention.

FIG. 3 illustrates a system 70 for overlaying networks in accordance with an aspect of the present invention. The system includes a graphical user interface (GUI) display 72 that provides a network view of a selected belief network. The GUI display 72 allows a user to select a belief network 82 from a set of belief networks 80 residing in a memory system locally or remotely. The selected belief network can be loaded by a loader 74, executed by an execution engine 76 and provided to the GUI display 72 to be displayed in a user friendly fashion. The system 70 is further operative to allow a user to load a second belief network 82 to be compared to the first loaded belief network to provide a network overlay view. The second network 82 is loaded by the loader 74, executed by the execution engine 76 and provided to the network overlay 78.

The network overlay 78 compares parameters associated with nodes of the first network with nodes of the second network to determine the effectiveness of the first network compared to the second network. The comparison is then provided to the GUI display 72 to provide a comparison view of the two networks. The network overlay can provide insight into how effective a mission is progressing in comparison to the effectiveness of an adversary. The network overlay 78 can provide a comparison of parameters (e.g., beliefs, disbeliefs) of several hypothesis of one network to similar hypothesis of another network. A decision can then be made to redirect resources based on the comparison and/or maintain a certain amount of resources at a given hypothesis. Additionally, the network overlay 78 can be utilized to provide a comparison to two adversaries, such that a decision in resources can be directed to certain areas represented by hypothesis of the adversaries, or directed to one adversary over the other. It is to be appreciated that nodes that do not have matches between networks can be ignored or combined into other nodes during a comparison. Parity can be determined if a parameter of one network is equivalent to the parameter of a second network.

Figure 4:
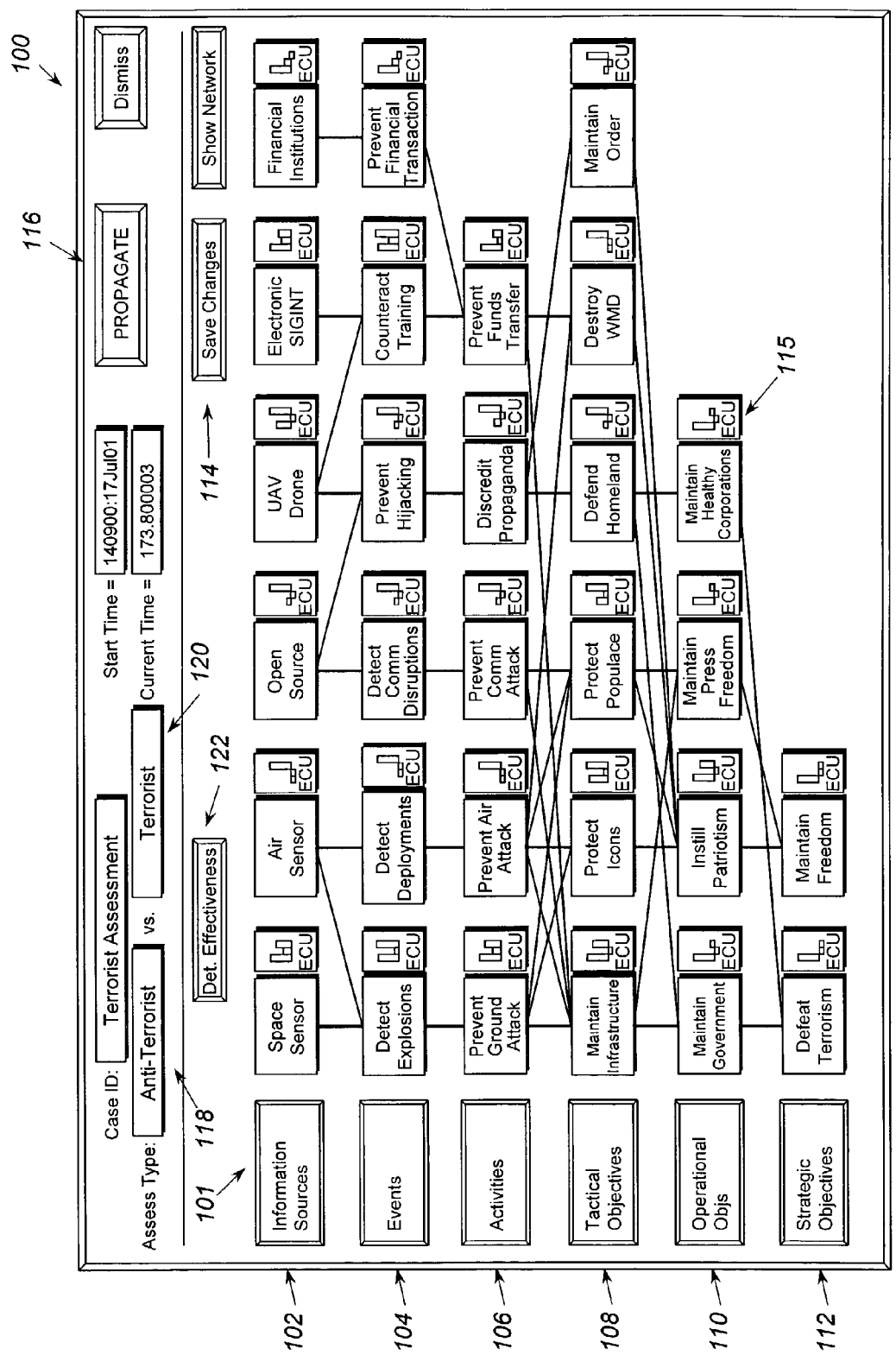
FIG. 4 illustrates a graphical user interface for displaying a network overview in accordance with an aspect of the present invention.

FIG. 4 illustrates a network overview GUI 100 in accordance with an aspect of the present invention. A primary belief network 101 is displayed in the network overview GUI 100. The primary belief network 101 is an anti-terrorist type network 118 that is comprised of six layers of nodes. Each node is provided with three parameters referred to as a triad (e.g., belief, disbelief, unknown). The first layer is an information source layer 102 that is provided with input information and/or new evidence that propagates through intermediate layers, such as an events layer 104, an activities layer 106, a tactical objectives layer 108 and an operational objectives layer 110 to a strategic objective layer 112 that is an assessment layer. The input information and/or new evidence is propagated through links that provide the associated weights or multipliers of the parameters to form new parameters associated with the nodes of the intermediate and assessment layers.

A secondary network can be loaded to provide a comparison of the effectiveness of the primary network with the secondary network. A terrorist type network 120 has been loaded to compare with the anti-terrorist type network 118 in a network overlay. A user can select a "Determine Effectiveness" button 122 with a computer pointer (e.g., a computer mouse), which provides a comparison of the beliefs, disbeliefs and unknowns between the two networks via node indicators 115. A user can modify the node parameters and link values of the primary network by selecting a particular node or link. The node parameters can be overridden or new evidence fused with the node parameters at any location in the primary belief network 101. The link values can be changed at any location in the primary belief network 101. A user can save the changes by selecting a "Save Changes" button 114 and invoke a back propagation routine by selecting a "Propagate" button 116. The back propagation routine updates upper layers of the belief network based on the modified node values. A user can define how many layers should be updated by the back propagation routine. A forward propagation routine is then automatically carried out so that the parameters of the remaining layers can be updated to facilitate the mathematical correctness of the belief network 101.

Figure 5:
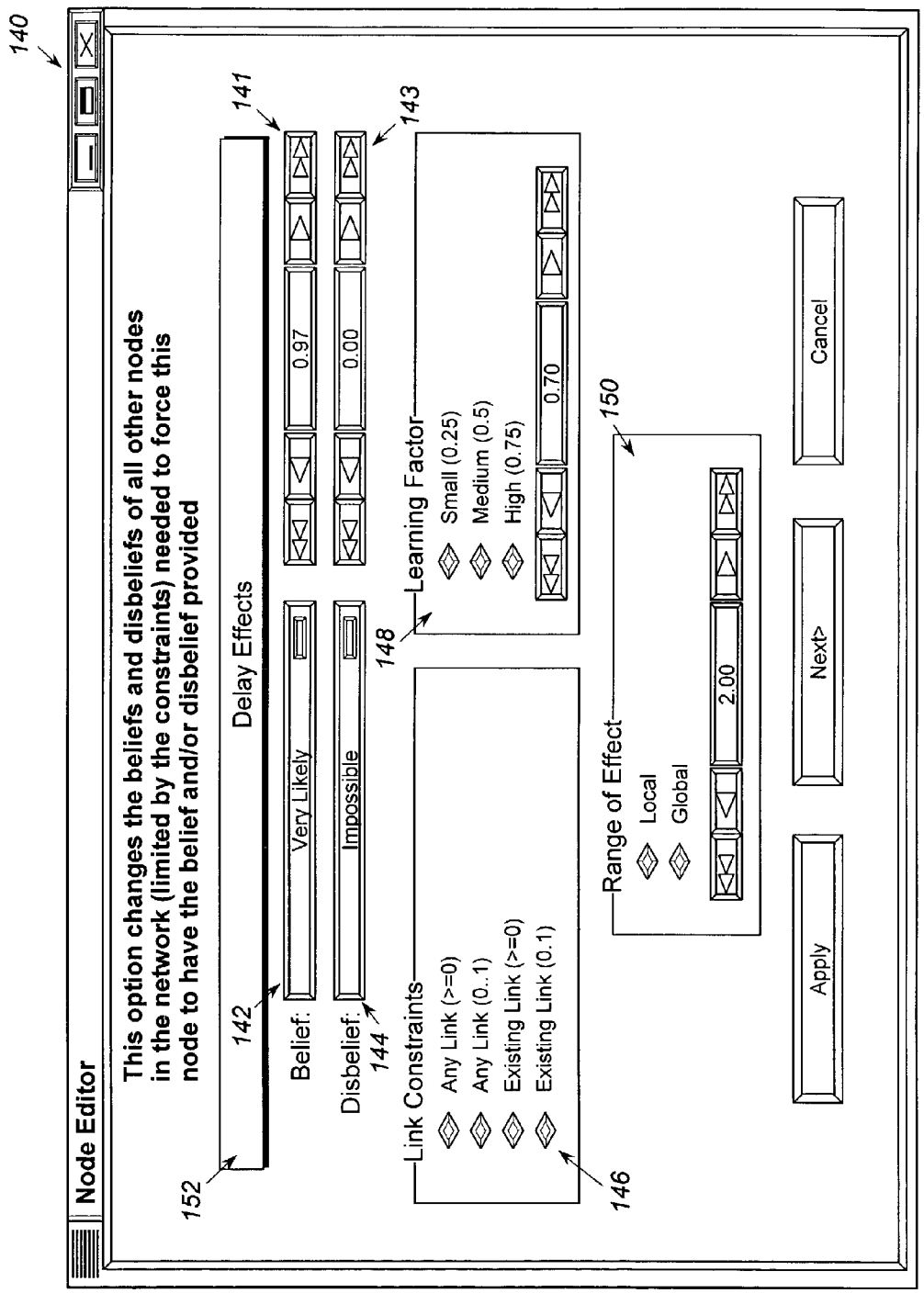
FIG. 5 illustrates a graphical user interface of a node editor in accordance with an aspect of the present invention.

FIG. 5 illustrates an example of a node override editor menu 140 in accordance with an aspect of the present invention. The node override editor menu 140 includes a belief input box 141 and a disbelief input box 143 that allows a user to modify belief and disbelief values of a given node. A belief selection menu 142 is associated with the belief input box 141. The belief selection menu 142 provides linguistic likelihood terms associated with a given numeric value that can be provided as input to the belief input box 141. A disbelief selection menu 144 is associated with the disbelief input box 143. A disbelief selection menu 144 provides linguistic likelihood terms associated with a given numeric value that can be provided as input to the disbelief input box 143. For example, a user can select that a hypothesis is very likely which is assigned a value of 0.97, likely, which can be assigned a value of about 0.8, probable that can be assigned a value of about 0.6, doubtful which can be assigned a value of about 0.25 and impossible which can be assigned a value of 0.0. It is to be appreciated that a variety of linguistic terms and values can be provided in accordance with the present invention. Alternatively, a user can enter override belief values directly in the belief input box 141 and/or can enter override values directly into the disbelief input box 143.

The node editor 140 also includes a link constraints selection box 146 that allows a user to select from a plurality of link constraints. The node editor 140 also includes a learning factor selection editor 148 that allows a user to select from predefined learning factors or directly input a learning factor rate input to an input box, for example, using selection arrows. The node editor 140 also includes a range-of-effect editor 150, so the user can define the number of layers that the parameter overrides will propagate upwards or backwards through the belief network. An error will be displayed if the selected inputs exceed any constraints of the belief network. A user can directly input a range, for example, using selection arrows. A user can apply the selected values to the nodes by selecting an apply button. The node editor example is shown for the "Delay effects" hypothesis 152.

Figure 6:
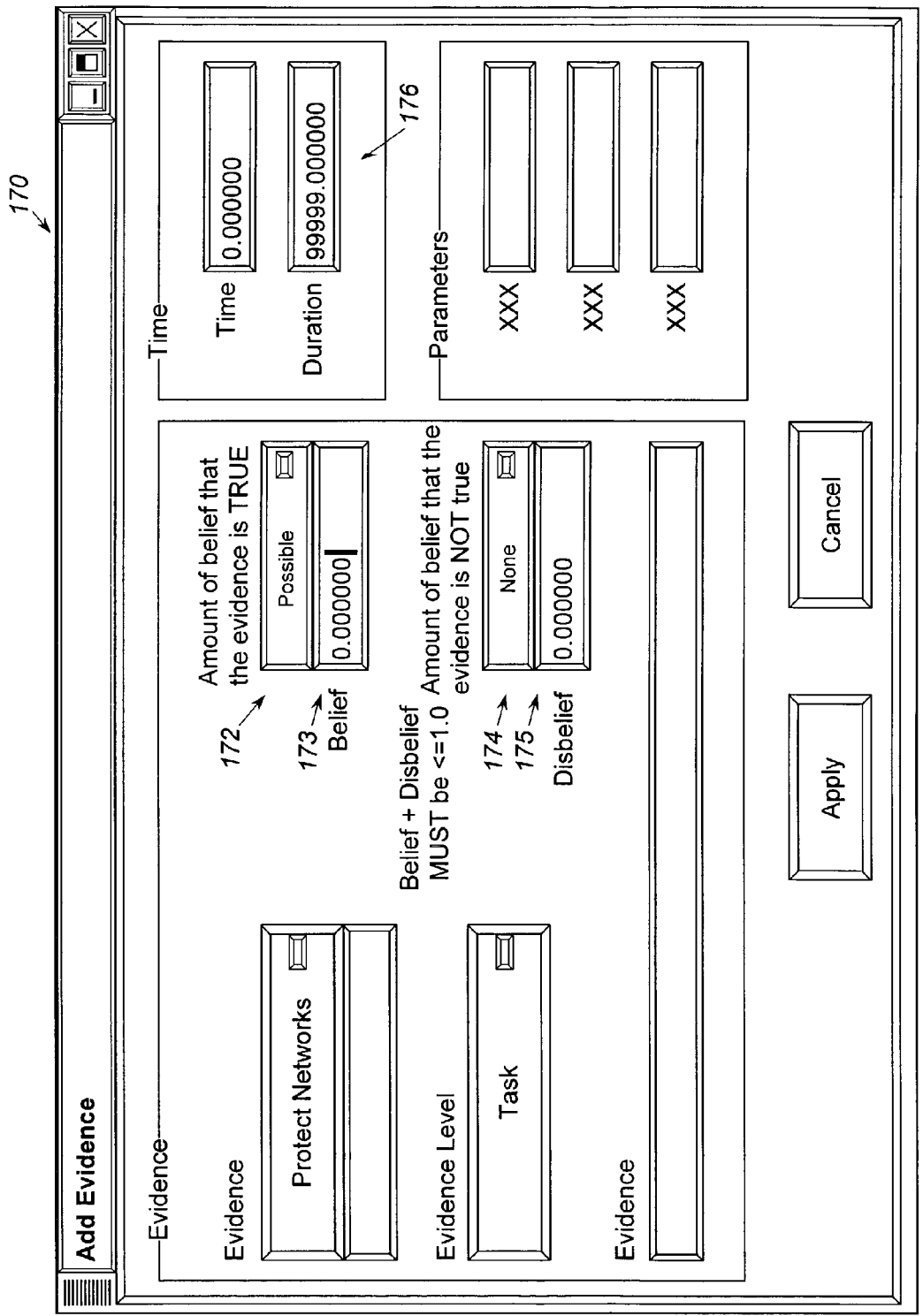
FIG. 6 illustrates a graphical user interface of an add evidence editor in accordance with an aspect of the present invention.

FIG. 6 illustrates an example of a node add evidence editor menu 170 in accordance with an aspect of the present invention. The node add evidence editor menu 170 allows a user to add belief values and disbelief values to current beliefs and disbeliefs of a given node. A belief selection box 172 provides a belief default selection menu that provide linguistic likelihood terms associated with a given numeric value that can be provided as input to a belief input box 173. A disbelief selection box 174 provides a disbelief default selection menu that provide linguistic likelihood terms associated with a given numeric value that can be provided as input to the disbelief input box 175. Alternatively, a user can enter belief values directly in the belief input box 173 and/or can enter override values directly into the disbelief input box 175. The selected belief value and disbelief value will be selected such that the belief value added to the disbelief value will be less than or equal to one. A user can select a time period over which to add the new evidence using a time period editor 176. The added belief values will then be fused with the current evidence by utilizing the mechanism illustrated in FIG. 1.

Figure 7:
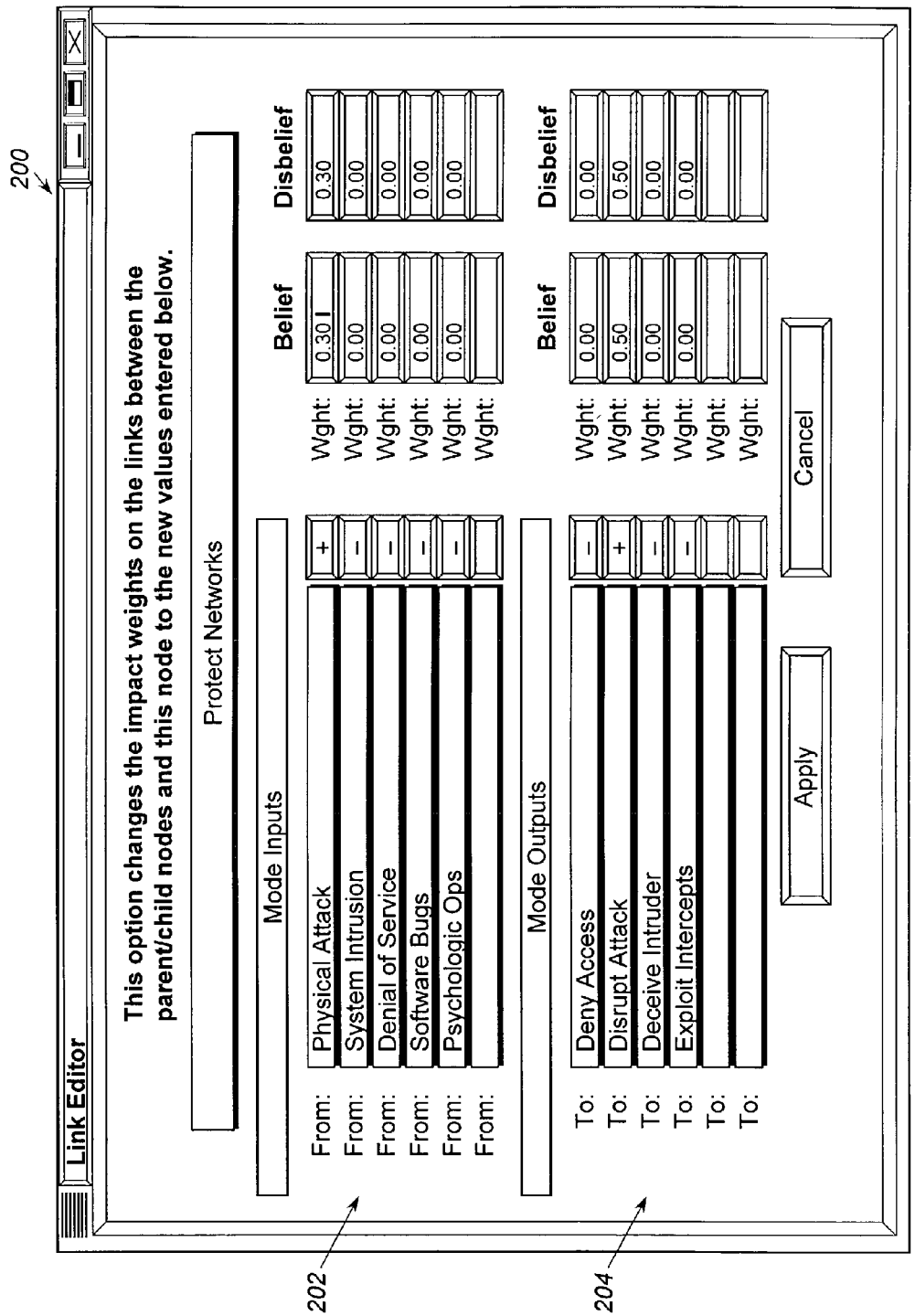
FIG. 7 illustrates a graphical user interface of a link editor in accordance with an aspect of the present invention.

FIG. 7 illustrates an example of a link editor menu 170 in accordance with an aspect of the present invention. The link editor menu 170 allows a user to modify link weights for input links and output links of a selected node. The link editor menu includes a node input selection editor 202 and a node output selection menu 204. A user can input link weights for both belief links and disbelief links for the node input links. A user also inputs link weights for both belief links and disbelief links for the node output links. The old link weights will be overridden when a user selects the desired link weights and selects an "Apply" button. An error screen will be displayed if the selected weights constrain the overall belief network system.

In one aspect of the invention, an inverse function has been provided. The inverse function provides a user with a mechanism to determine a desired threshold amount of an associated parameter (e.g., belief, disbelief) needed to reach a confidence or decision threshold. For example, if a confidence threshold of belief of a given hypothesis is 95% and the current belief is about 70%, the inverse function can be evaluated to determine how much additional evidence is needed to reach the confidence threshold. Once the confidence or decision threshold is reached, a user can make an informed decision. Alternatively, if the evidence being received is predictable, it can be predicted when the hypothesis will reach a desired confidence or decision threshold. Linguistic values can be associated with different inverse function evaluations to provide a user with terms to provide more informative decision-making.

In matrix theory, the identity matrix multiplied by any matrix leaves the matrix unchanged. The equivalent for Dempster-Shafer theory is the $\{B, U, D\}$ triad where: $I=\{0, 1, 0\}$ corresponds to complete ignorance or unknown. The inverse of a matrix, multiplied by the matrix, produces the identity $(A \oplus A^* = I)$, where $\oplus$ denotes the fusion operator. For Dempster-Shafer theory, this inverse was discovered. Fused with the corresponding evidence triad, the inverse triad produced the identity triad $\{0, 1, 0\}$. The criteria for deriving the inverse is as follows:

$$(bB+bU+uB)/(1-dB-bD)=0 \quad \text{EQ. 5}$$

$$uU/(1-dB-bD)=1 \quad \text{EQ. 6}$$

$$(dD+dU+uD)/(1-dB-bD)=0 \quad \text{EQ. 7}$$

These equations can be solved simultaneously for $\{B, U, D\}$ in terms of $\{b, u, d\}$ yields:

$$B=-b/[(b+u)(u-bd/\{b+u\}-bd/\{d+u\})] \quad \text{EQ. 8}$$

$$U=1/(u-bd/\{b+u\}-bd/\{d+u\}) \quad \text{EQ. 9}$$

$$D=-d/[(d+u)(u-bd/\{b+u\}-bd/\{d+u\})] \quad \text{EQ. 10}$$

where b is the current belief value, d is the current disbelief value and u is the unknown value of the evidence, B is the belief value, D is the disbelief value and U is the unknown value of the inverse matrix. The existence of an inverse means that fusion equations can be solved arithmetically. Given triad A and triad C, we can find triad B such that $A \oplus B=C$. In other words, it is possible to determine how much additional evidence is required to push existing evidence over a decision-making threshold; e.g., given fairly strong belief $\{0.75, 0.10, 0.15\}$, what additional evidence is required to eliminate conflict and reach a decision threshold of $\{0.95, 0.05, 0\}$. The inverse contains $\{B, U, D\}$ values outside the interval $[0, 1]$. However, the result of fusing an inverse with any $\{B, U, D\}$ triad produces valid results; i.e., all resulting triads had values on $[0, 1]$. Algebraically, an abelian group can be described, except that the inverse is not closed on $[0, 1]$.

Figure 8:
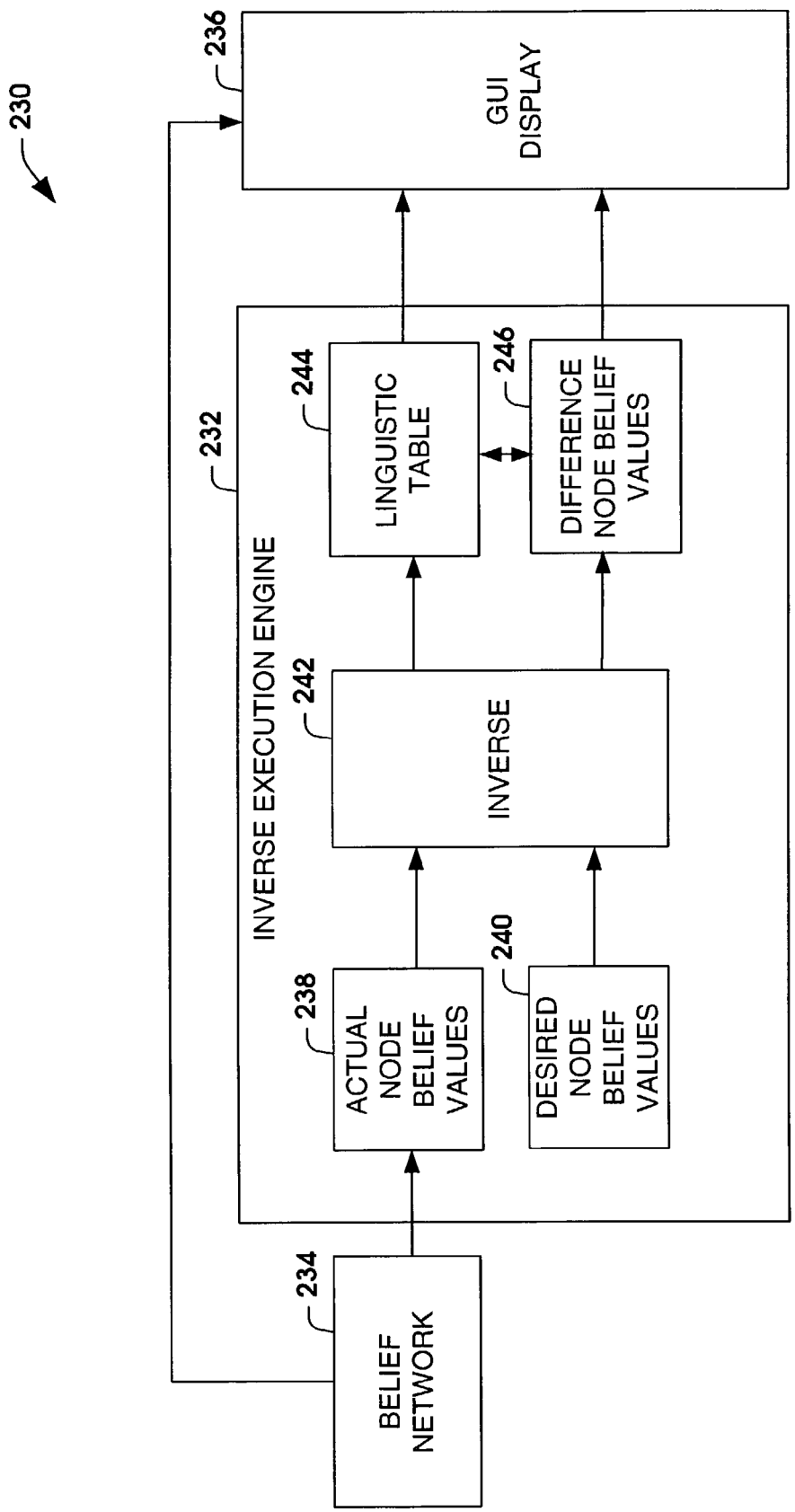
FIG. 8 illustrates a system for providing an inverse value of one or more parameters of a belief network in accordance with an aspect of the present invention.

FIG. 8 illustrates a system 230 for providing an inverse value of one or more parameters in accordance with an aspect of the present invention. The system 230 includes an inverse execution engine 232 that extracts one or more parameter values from a belief network 234. The inverse execution engine 232 evaluates an inverse of the extracted parameters and then provides an associated linguistic term and the inverse value to a GUI display 236. The inverse execution engine 232 extracts actual node belief values 238 from the belief network 234. The extracted actual node belief values 238 and desired node belief values 240 are provided to an inverse function component 242. The inverse function component 232 then evaluates the inverse of the actual node belief values 238 and the desired node belief values 240 by mathematically evaluating the fusion equations as illustrated above and providing a set of difference node belief values 246. The difference node belief values 246 represent the desired additional evidence needed to reach a desired belief threshold. Additionally, linguistic terms are associated with the inverse values using a linguistic table 244. The difference node belief values 246 and the linguistic terms are then provided to the GUI display 236. It is to be appreciated that the system 230 can be utilized to evaluate the inverse of disbeliefs in addition to the inverse of beliefs.

It is to be appreciated that in real world situations, data can be degraded, lost or conflicting. Additionally, a human's perception can be perturbed, for example, due to fatigue, perception, bias in addition to other factors. In one aspect of the present invention, a fog component is provided that invokes perturbation or agitation of data and human decision making that is controllable by a user. Therefore, various simulations can be executed to determine if desired thresholds can be achieved in view of perturbation or agitation of various factors. The present invention allows a user to select a node and provide a temporal display of the beliefs, disbeliefs and unknown parameters of that node over time. A user can then be provided with time information to make a more informative decision.

Figure 9:
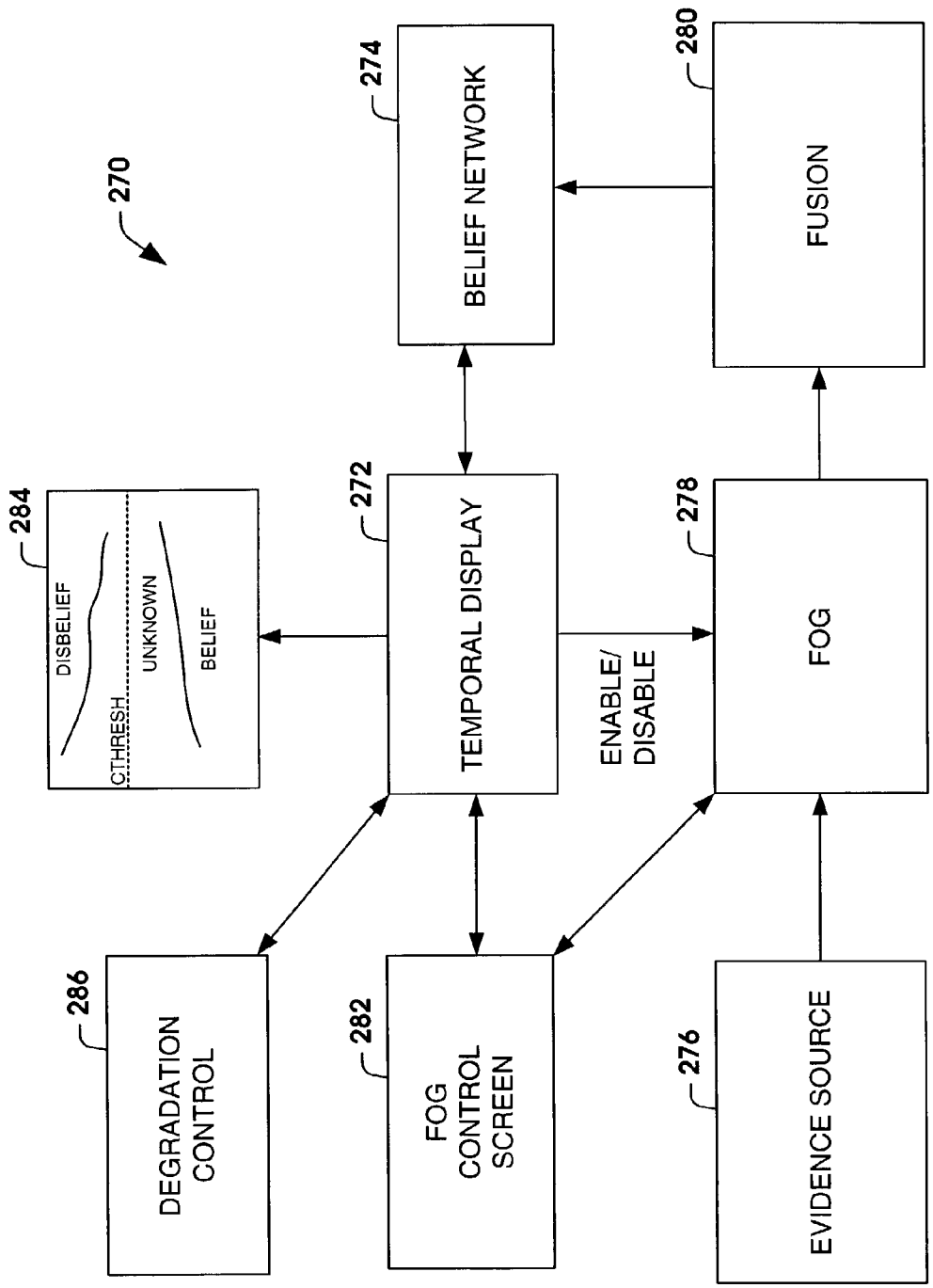
FIG. 9 illustrates a system for perturbation of one or more parameters associated with a belief network in accordance with an aspect of the present invention.

FIG. 9 illustrates a system 270 for perturbation of one or more parameters associated with a belief network. The system 270 includes a temporal display 272 that displays parameters (e.g., belief values, disbelief values, unknown values) over time of a selected hypothesis or node associated with a belief network. The temporal display 272 also provides a graphical display 284 of belief, disbelief and unknown parameters over time for a selected node. The temporal display 272 can be invoked through a network display view. A user can enable and disable a fog component 278 employing the temporal display 272. The fog component 278 provides one or more perturbation variables that can be selected and adjusted to modify new evidence. The frequency and severity of the perturbation variables can be selected and controlled by a fog control screen 282. The perturbation variables include data perturbation variables and human perturbation variables. The perturbation variables and the new evidence are provided to a fusion algorithm 280.

The fusion algorithm 280 fuses the perturbed new evidence with current evidence to update the belief network according to a user's control. The user can then select between nodes in the belief network to display parameter data over time of the selected node in the temporal display 272. A graphical display 284 is provided to display the belief, disbelief and unknown parameter data of the selected node. A degradation control component 286 selects degradation or rate duration factor of the belief, disbelief and unknown parameter data. The degradation control component 286 considers the fact that belief in a given hypothesis degrades over time. The degradation control component can degrade the parameter over time (e.g., linearly, exponentially, trigonometrically).

Figure 10:
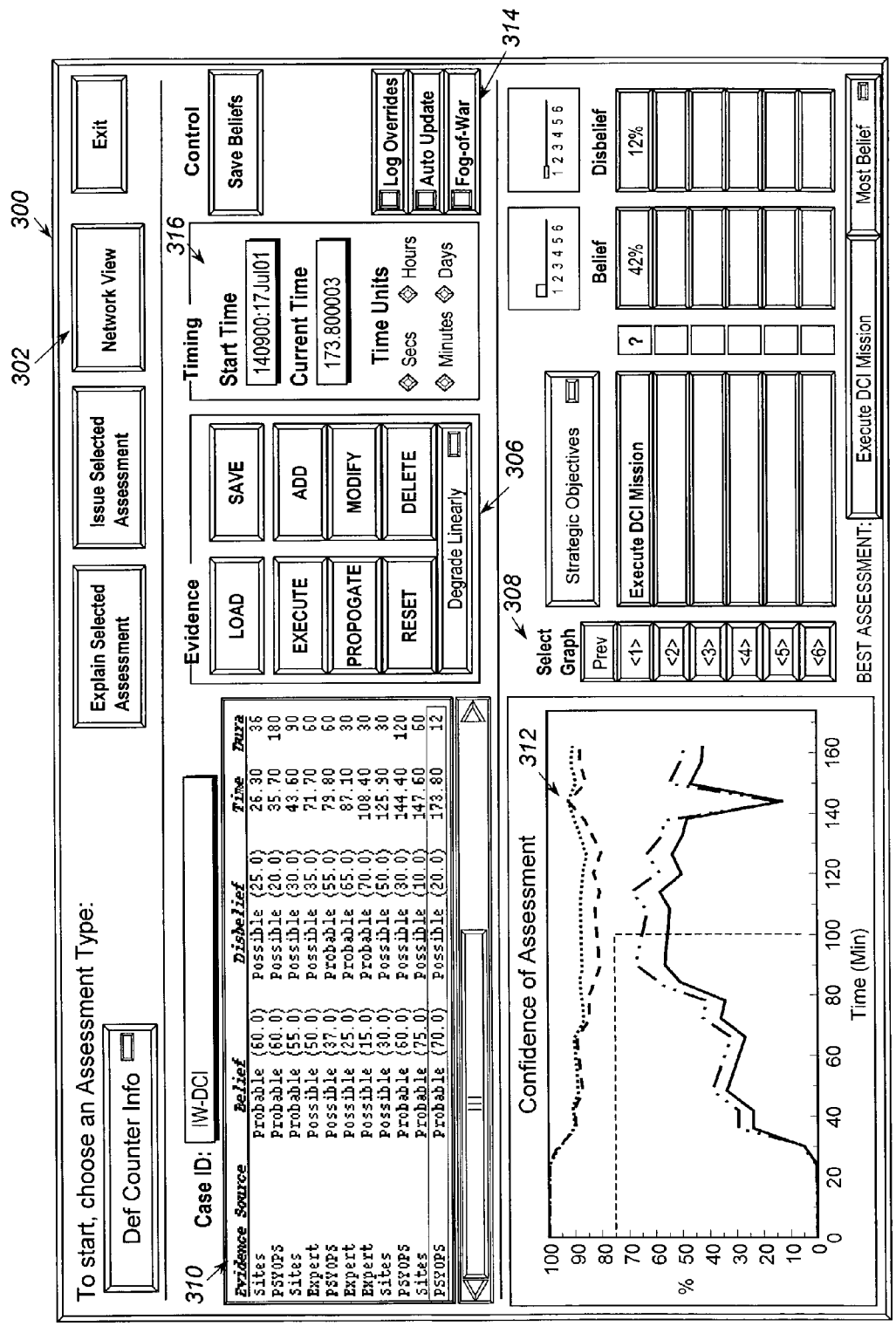
FIG. 10 illustrates a temporal display screen 300 in accordance with an aspect of the present invention.

FIG. 10 illustrates a temporal display screen 300 in accordance with an aspect of the present invention. The temporal display screen 300 includes a node selection editor 308 that allows a user to select one or more nodes to display parameter data over time associated with the one or more nodes. The temporal display screen 300 includes a parameter data display 310 that provides a display of belief values and disbelief values over time associated with the one or more selected nodes. The temporal display screen 300 also includes a graphical display 312 that plots a display graph associated with the belief values and disbelief values over time associated with the one or more selected nodes. The display graph plots the value of the belief and disbeliefs in addition to a confidence threshold level. The confidence threshold level is a belief value that a corresponding belief value of a hypothesis or node should reach for a user to be confident in making a decision.

The temporal display screen 300 also includes an evidence editor portion 304 that allows a user to load nodes or belief networks, add to or modify belief values, and propagate parameter value changes throughout the belief network. The time unit interval for collecting parameter values can be selected utilizing a timing component 316. The user can also select the time units (e.g., seconds, minutes, hours, days) using the timing component 316. The evidence editor portion 304 also includes a degradation component 306. A user can select a degradation type (e.g., linear, exponential, trigonometric) to degrade data over time. For example, new belief and disbelief values can be received at specific predetermined time intervals. Prior to receiving new evidence for a respective node, the belief values and disbelief values are degraded bases on the degradation type selected by the degradation component 306. This is to account for the hypothesis that belief data received at a given time will be less reliable or believable over time. Once new evidence is received, the belief and disbelief values can be updated by fusing the new evidence with the current belief and disbelief values.

A user can change to a belief network view by selecting a "Network View" button 302. Additionally, a user can enable and disable a fog component by checking an enable fog box within a fog component button 314. The user can invoke a fog control screen by selecting the fog component button using a computer pointer (e.g., a computer mouse). The fog control screen allows a user to edit different fog or perturbation components that effect or degrade belief and disbelief values. A user can then determined what effects different agitation factors will have on a desired belief outcome.

Figure 11:
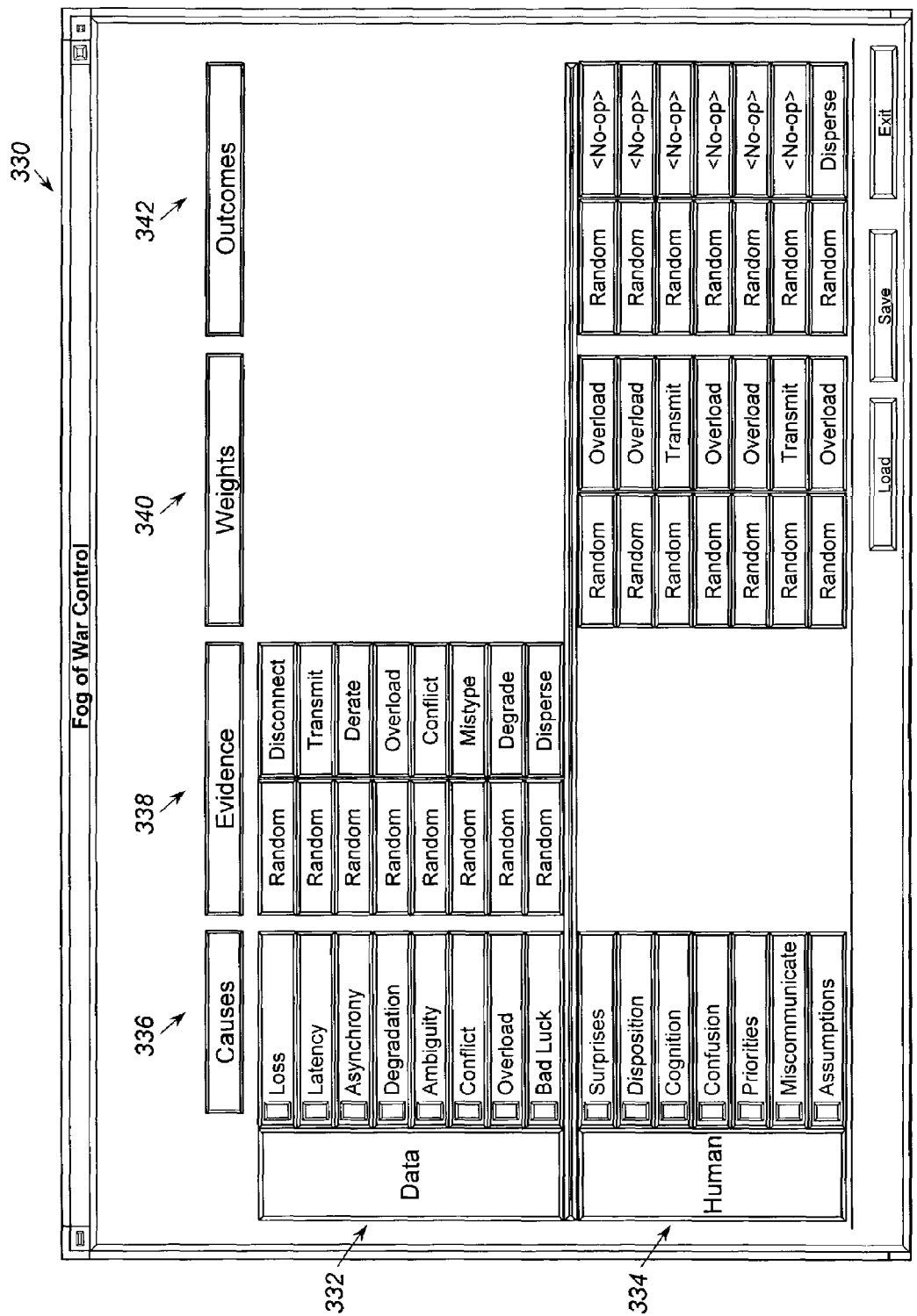
FIG. 11 illustrates a fog control screen in accordance with an aspect of the present invention.

FIG. 11 illustrates a fog control screen 330 in accordance with an aspect of the present invention. The fog control screen 330 includes a set of data agitation parameters 332 and a set of human agitation parameters 334 that effect the belief and disbelief values associated with one or more hypothesis. For example, factors that agitate data can include loss, latency, asynchrony, degradation, ambiguity, conflict, overload, and bad luck. Factors that agitate a human can include surprises, disposition, cognition, confusion, priorities, miscommunication and assumptions. Evidence types 338 can be associated with agitation factors 336 and weights 340 can be associated with the agitation factors 336. In the current example, evidence types 336 are associated with the data agitation factors 332 and weights are associated with the human agitation factors 334. A set of outcomes 342 are also associated with the human agitation factors 334.

Figure 12:
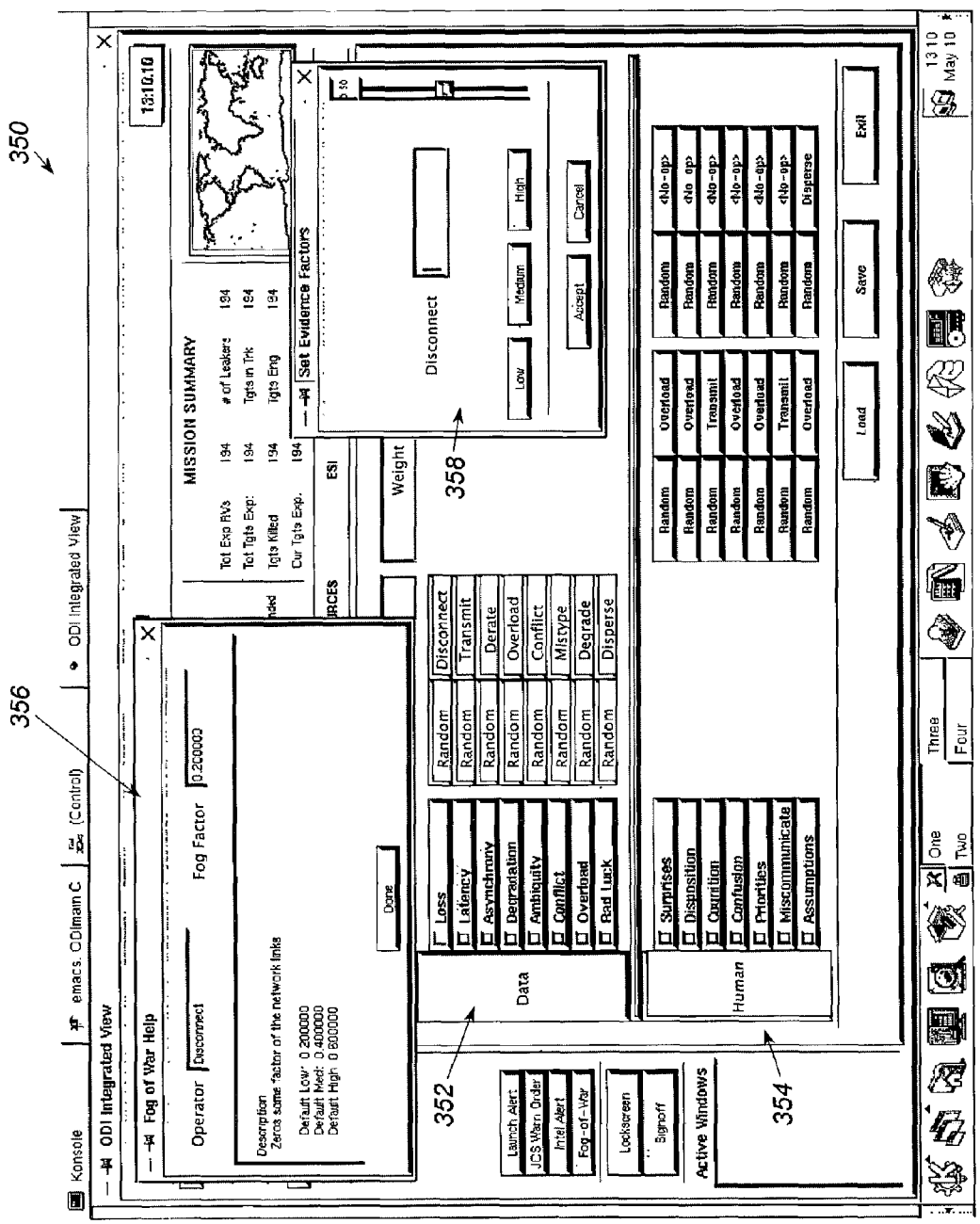
FIG. 12 illustrates a more detailed view of a fog control screen in accordance with an aspect of the present invention.

FIG. 12 illustrates a more detailed view of a fog control screen 350 in accordance with an aspect of the present invention. The fog control screen 350 includes a set of data agitation factors 352 and a set of human agitation factors 354 that affect the belief and disbelief values associated with one or more hypothesis. The agitation factors are similar to the agitation factors discussed with respect to FIG. 11. A user can be provided a "set evidence factor" screen 358 by selecting a particular agitation factor. The evidence factor values or frequency of perturbation can be typed into an evidence input box of the "set evidence factor" screen 358, or default values provided by selecting from a low button (e.g., 0.20), a medium button (e.g., 0.40) and a high button (e.g., 0.60). A slide bar can also be employed to provide the desired evidence factor value. A help menu 356 can be employed to assist a user in defining and determining information associated one or more functions of the fog control screen 350. A user can be provided a similar set weight factor screen (not shown) to provide weight values by selecting a particular agitation factor associated with the weight agitation factors and inputting weight values similar to the mechanism illustrated in the description of the "set evidence factor" screen 358.

Figure 13:
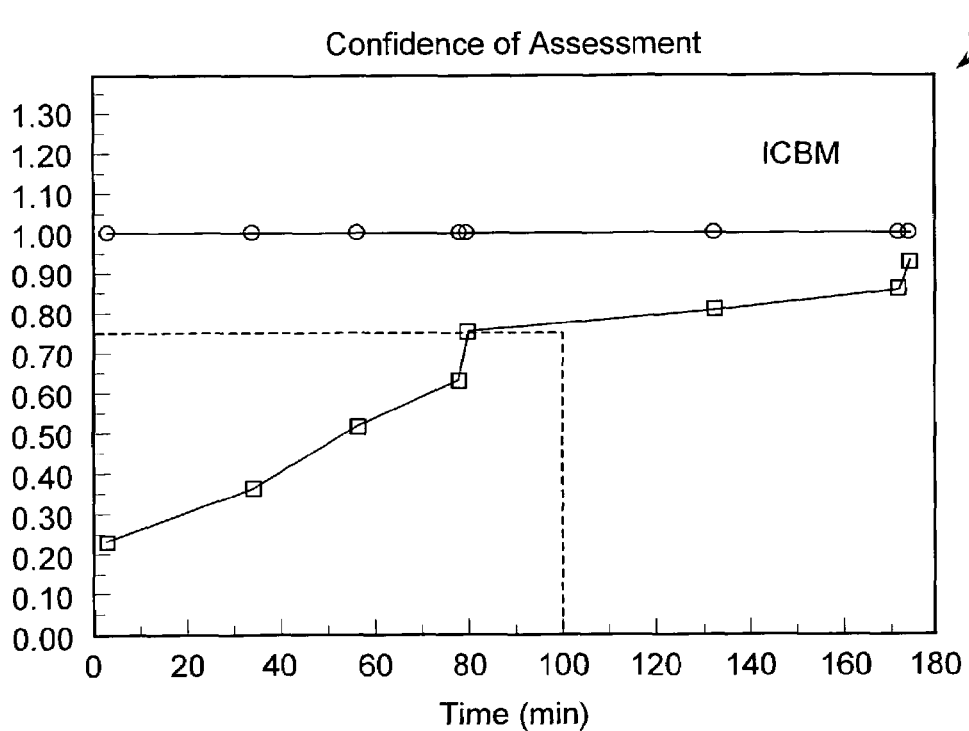
FIG. 13 illustrates a temporal display graph of belief versus time associated with a selected node with a disabled fog component in accordance with an aspect of the present invention.
Figure 14:
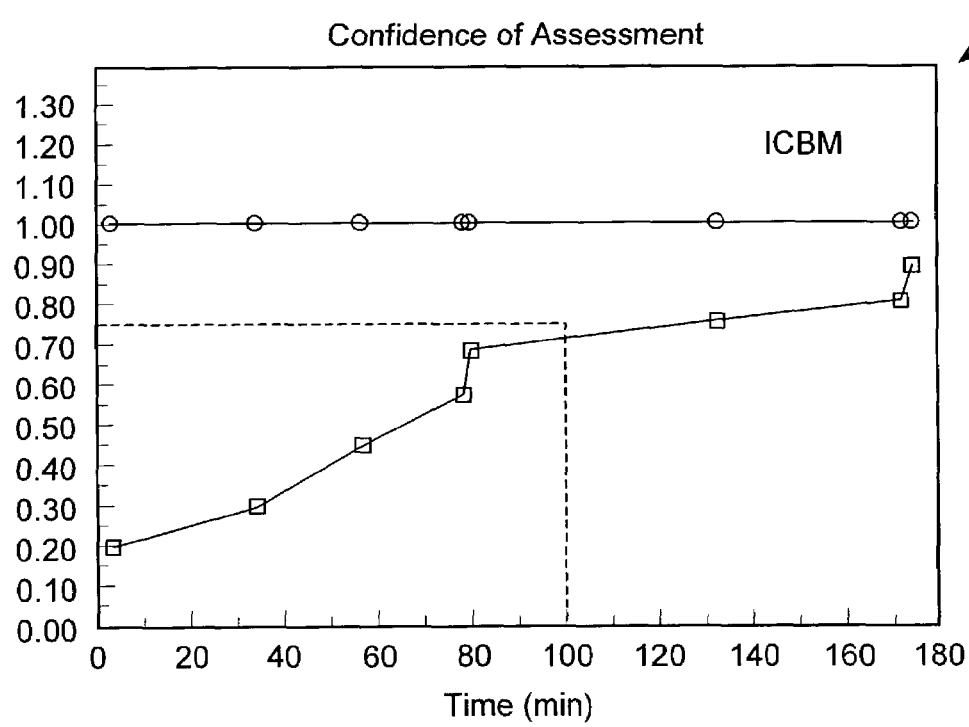
FIG. 14 illustrates a temporal display graph of belief versus time associated with a selected node with an enabled fog component in accordance with an aspect of the present invention.

FIG. 13 illustrates a temporal display graph 360 of belief versus time associated with a node to determine confidence assessment of a selected hypothesis with the fog component disabled. FIG. 14 illustrates a temporal display graph 370 of belief versus time associated with the same node of FIG. 13 to determine confidence assessment of the selected hypothesis with the fog component enabled. As illustrated in the graphs of FIGS. 13-14, the disabling or absence of the fog provides a belief over time that achieves a desired confidence threshold such that a decision is reached in FIG. 13 at about 80 minutes with a belief of about 0.75. However, FIG. 14 illustrates that the enabling or presence of the fog has reduced the belief in the hypothesis over time, such that with the fog enabled, the confidence threshold is not achieved prior to a desired time period of 100 minutes. Therefore, with fog enabled a user will have to make a decision prior to reaching the desired confidence threshold.

In view of the foregoing structural and functional features described above, methodology in accordance with various aspects of the present invention will be better appreciated with reference to FIGS. 15-18. While, for purposes of simplicity of explanation, the methodology of FIGS. 15-18 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

Figure 15:
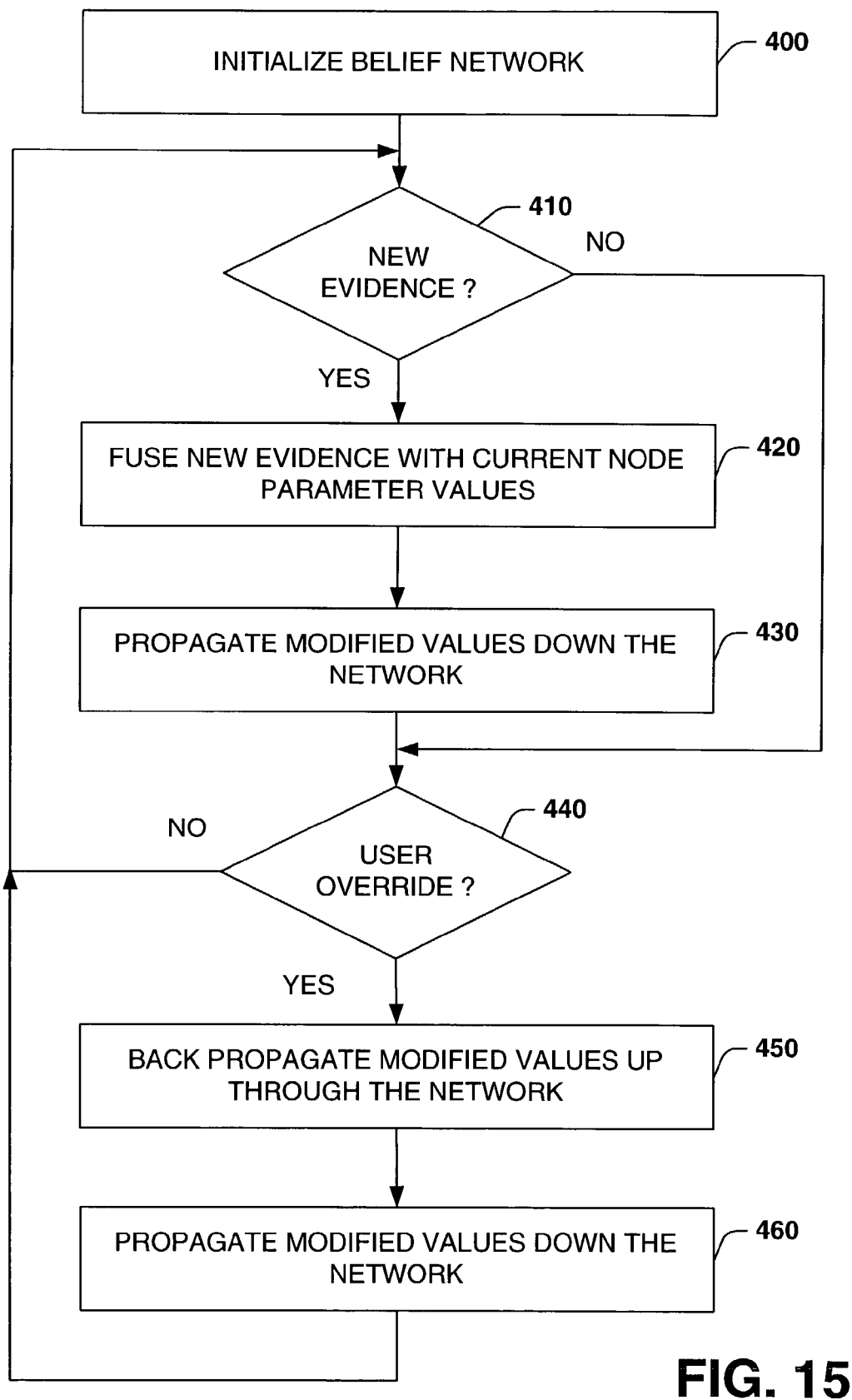
FIG. 15 illustrates a methodology for fusing evidence into a belief network in accordance with an aspect of the present invention.

FIG. 15 illustrates a methodology for fusing evidence into a belief network in accordance with an aspect of the present invention. The methodology begins at 400 where the belief network is initialized. The belief network can be a belief network that conforms to the Dempster-Shafer combination rule, such that each hypothesis or node includes a belief value, a disbelief value and an unknown value. The belief value, the disbelief value and the unknown value have a sum equal to one. The initial values begin with complete uncertainty such that the belief and disbelief values are equal to zero and the unknown value is equal to one. The initialization parameters (belief values, disbelief values, unknown values) are propagated downward through the network such that the entire belief network is initialized. The methodology then advances to 410.

At 410, the methodology determines if any new evidence is received. If new evidence is received at 410 (YES), the methodology proceeds to 420. At 420, new evidence is fused with current node parameter values by a Cartesian Product as illustrated in FIG. 1. New node parameter values are determined for nodes in the top layers of the belief networks, such that parameters associated with one or more hypothesis or nodes in the top layers of the belief network are modified. The methodology then proceeds to 430. At 430, the modified parameter values are then propagated down through the lower layers of the belief network. The methodology then proceeds to 440. Alternatively, the methodology can return to 410 to determine if new evidence has been received. If new evidence is not received at 410 (NO), the methodology also proceeds to 440.

At 440, the methodology determines if a user override has occurred. If a user override has not occurred at 440, the methodology returns to 410 to determine if new evidence has been received. If a user override has occurred at 440, the methodology proceeds to 450. At 450, the node values are modified, for example, by overriding node parameter value, adding to node parameter values and modifying link values. The modified node values are then back propagated through the upper layers of the network. The number of layers that the back propagation can occur is selectable. If the selected number of layers does not include back propagation of the remaining upper layers, then the appropriate link values are adjusted to facilitate mathematical correctness of the belief network. The method then proceeds to 460. At 460, the modified values are then propagated down through the lower layers of the belief network. The methodology then returns to 410 to determine if new evidence has been received.

Figure 16:
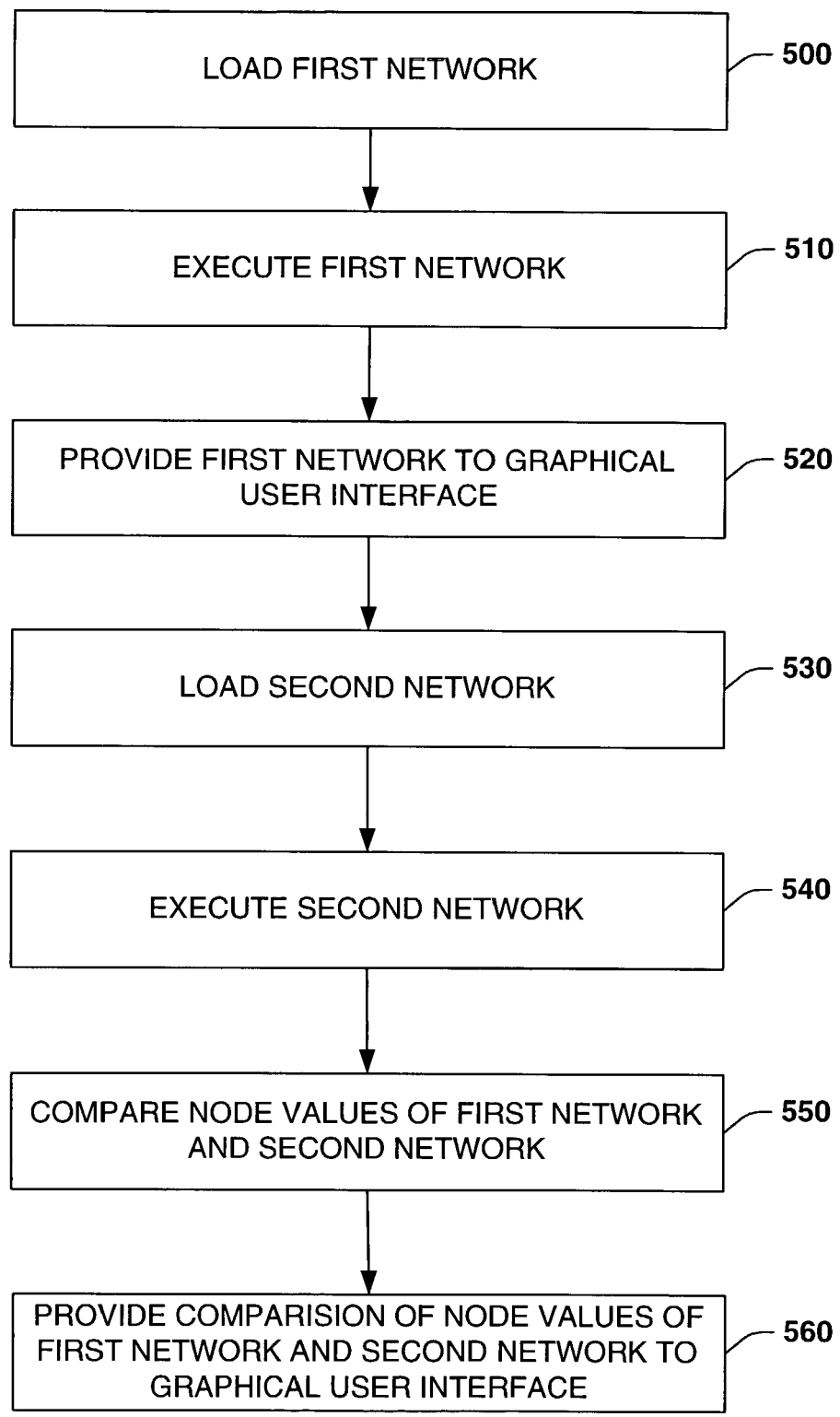
FIG. 16 illustrates a methodology for overlaying two decision networks in accordance with the present invention.

FIG. 16 illustrates a methodology for overlaying two networks in accordance with the present invention. The two networks can be both belief networks. However, the overlaying of two networks can be different network types (e.g., Bayesian networks). The methodology begins at 500 where a first network is loaded. The first network then is executed at 510. Execution can include input of node parameters (e.g., belief, disbelief) and calculation of parameters (e.g., unknown) and propagation of the input parameter through the first network. The methodology then proceeds to 520.

At 520, the first network and associated node parameter values are provided to a graphical user interface for display. At 530, a second network is loaded and the second network is then executed at 540. Execution can include input of node parameters (e.g., belief, disbelief) and calculation of parameters (e.g., unknown) and propagation of the input parameter through the second network. At 550, a comparison is made between the node values of the first and second network. For example, the comparison can include determining the ratio of the belief values of nodes of the first network to belief values of nodes of the second network. At 560, the comparison of the node values of the first and second network is provided to the graphical user interface for display with the first belief network.

Figure 17:
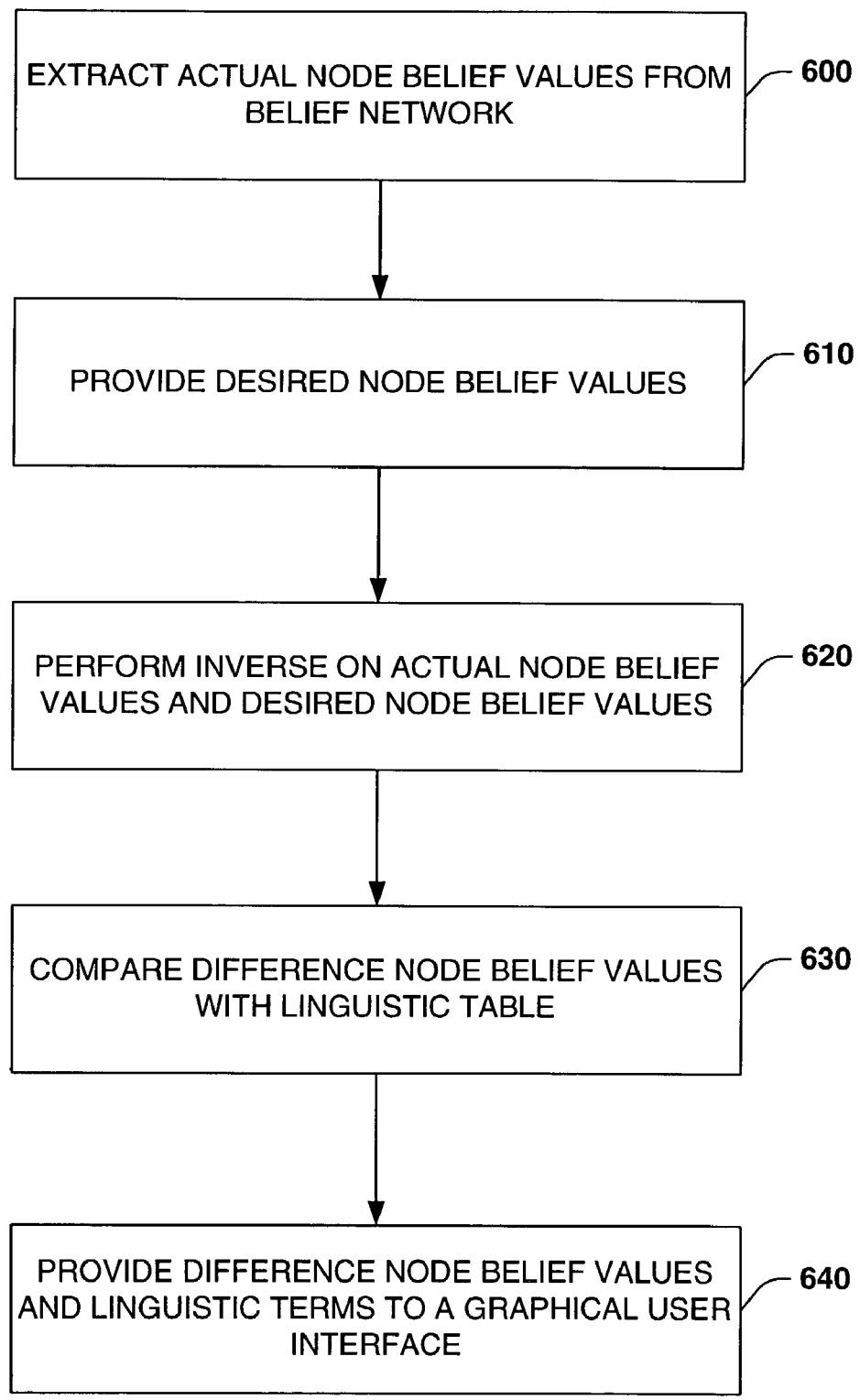
FIG. 17 illustrates a methodology for determining an inverse of node values in a Dempster-Shafer belief network in accordance with the present invention.

FIG. 17 illustrates a methodology for determining an inverse of node values in a Dempster-Shafer belief network in accordance with the present invention. The methodology begins at 600 where actual node belief values are extracted from a belief network. At 610, desired node belief values are provided. An inverse is then performed on actual node belief values and desired node belief values of one or more nodes at 620. The inverse provides difference node belief values by evaluating the equations 11-13 below concurrently for $\{B, U, D\}$ in terms of $\{b, u, d\}$:

$$B = -b/[(b+u)(u-bd/\{b+u\}-bd/\{d+u\})] \quad \text{EQ. 11}$$

$$U = 1/(u-bd/\{b+u\}-bd/\{d+u\}) \quad \text{EQ. 12}$$

$$D = -d/[(d+u)(u-bd/\{b+u\}-bd/\{d+u\})] \quad \text{EQ. 13}$$

where b is the current belief value, d is the current disbelief value and u is the unknown value of the evidence, B is the belief value, D is the disbelief value and U is the unknown value of the inverse. The existence of the inverse means that fusion equations can be solved arithmetically. Given triad A and triad C, we can find triad B such that $A \oplus D B = C$. In other words, it is possible to determine how much additional evidence is required to push existing evidence over a decision-making threshold.

At 630, the difference node belief values are compared with a linguistic table to determine linguistic terms associated with the difference node belief values. At 640, the difference node belief values and associated linguistic terms are provided to a graphical user interface to be displayed concurrently with the difference node belief values. Alternatively, one of the difference node belief values and the linguistic term can be displayed for one or more nodes in the belief network.

Figure 18:
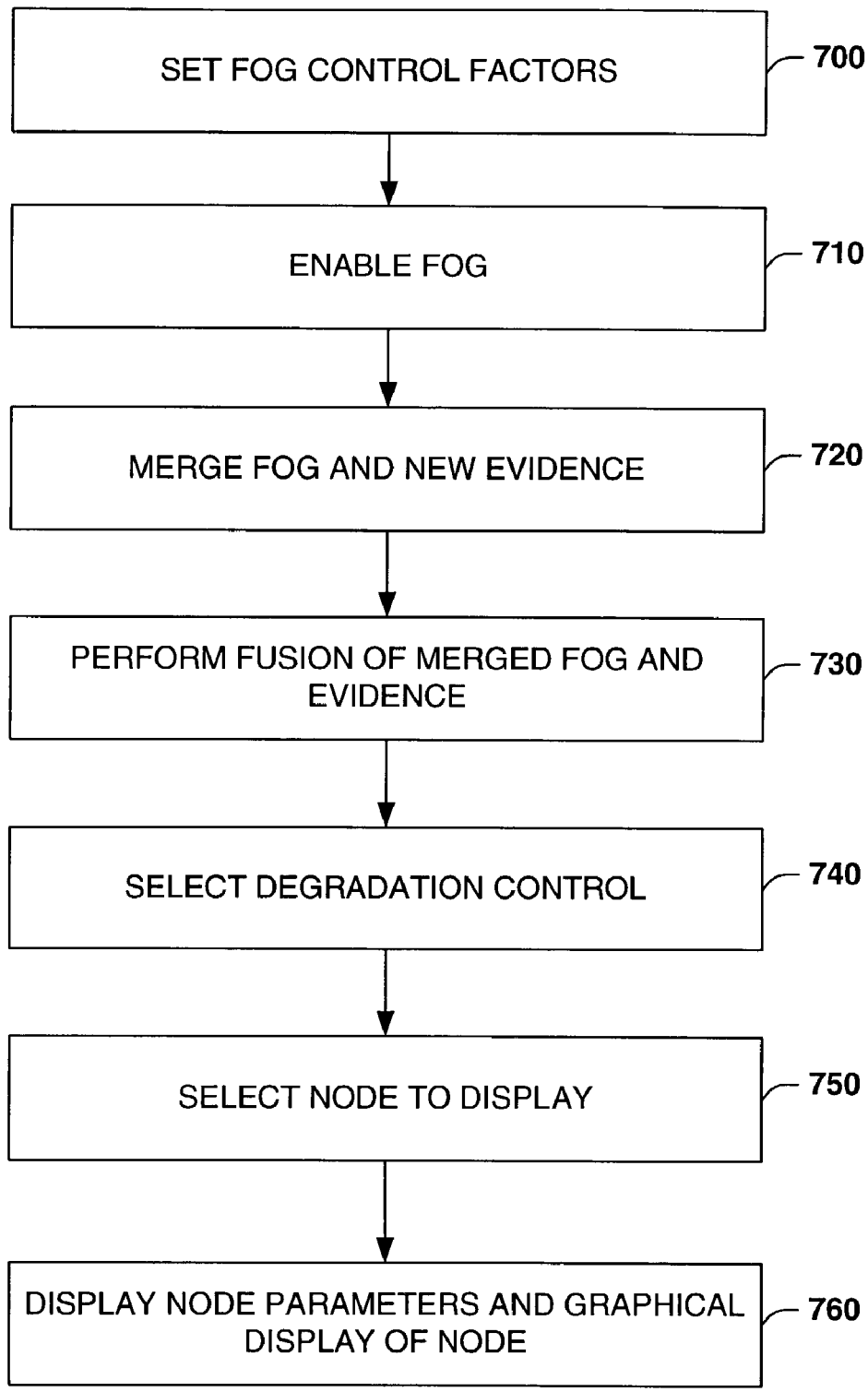
FIG. 18 illustrates a methodology for perturbing or agitating node values in a decision network in accordance with the present invention.

FIG. 18 illustrates a methodology for perturbing or agitating node values in a network in accordance with the present invention. The network can be a belief network (e.g., Dempster-Shafer belief network). However, the network can be a different network type (e.g., Bayesian network). At 700, the frequency of one or more fog control factors are set by a user or automatically. The fog control factors can be parameters associated with perturbing or agitating data. For example, the control parameters can include a set of data agitation parameters and a set of human agitation parameters that affect the belief and disbelief values associated with one or more hypothesis. At 710, the methodology enables the fog control factors. The fog control factors are then merged with new evidence at 720. At 730, the merged fog and new evidence is fused with current node parameter values. At 740, a degradation control is selected based on a decaying parameter type (e.g., linear, exponential, trigonometric). The methodology the selects a node to display at 750. At 760, the parameter values are then displayed in a temporal display including a graphical display of one or more node parameter values over time.

Figure 19:
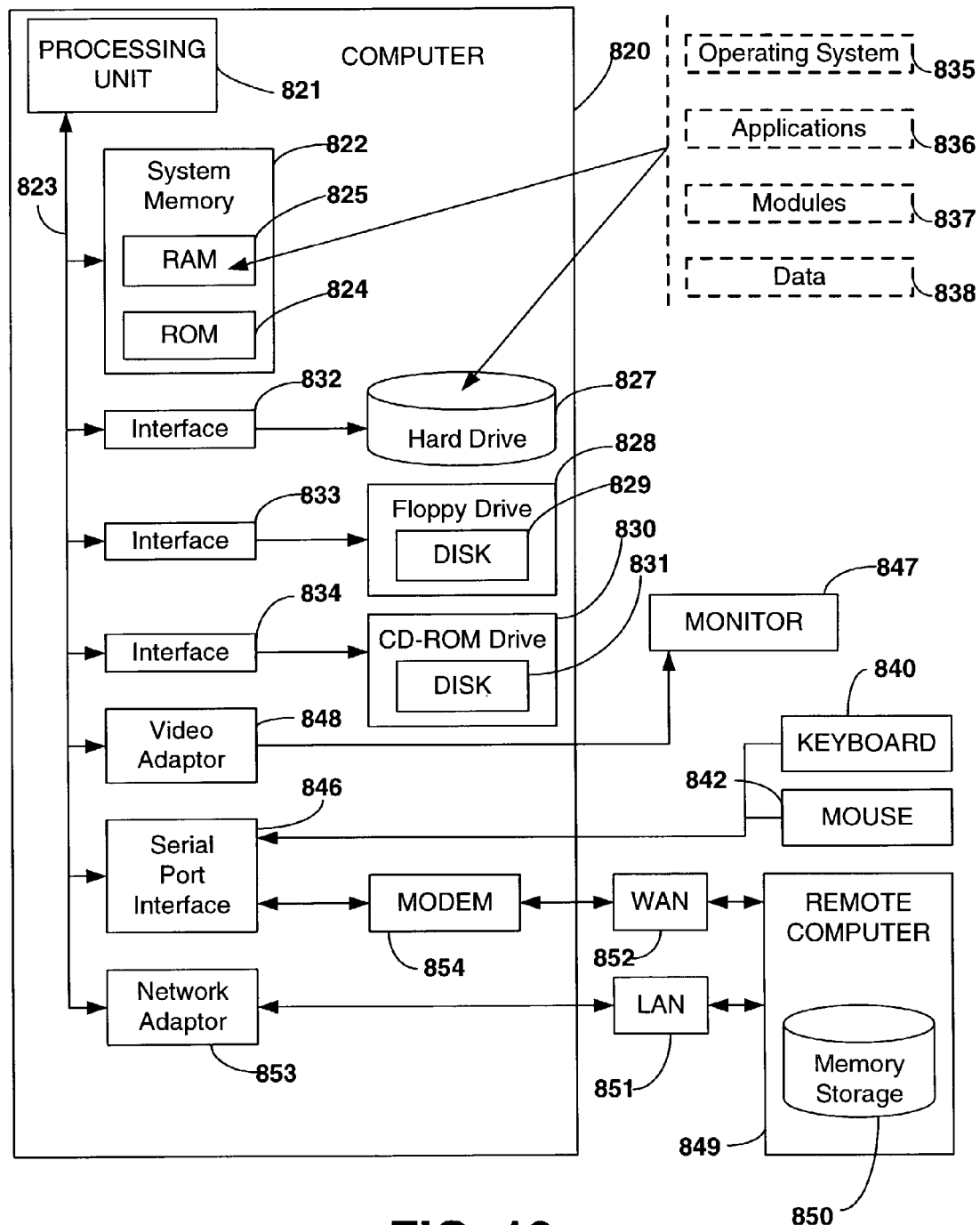
FIG. 19 illustrates a schematic block diagram of an exemplary operating environment for a system configured in accordance with the present invention.

In order to provide a context for the various aspects of the invention, FIG. 19 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on standalone computers. In a distributed computing environment, program modules may be located in both local and remote memory storage devices.

With reference to FIG. 19, an exemplary system for implementing the various aspects of the invention includes a conventional server computer 820, including a processing unit 821, a system memory 822, and a system bus 823 that couples various system components including the system memory to the processing unit 821. The processing unit may be any of various commercially available processors. Dual microprocessors and other multi-processor architectures also can be used as the processing unit 821. The system bus may be any of several types of bus structure including a memory bus or memory controller, a peripheral bus, and a local bus using any of a variety of conventional bus architectures. The system memory includes read only memory (ROM) 824 and random access memory (RAM) 825. A basic input/output system (BIOS), containing the basic routines that help to transfer information between elements within the server computer 820, such as during start-up, is stored in ROM 824.

The server computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the server computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 825, including an operating system 835, one or more application programs 836, other program modules 837, and program data 838. A user may enter commands and information into the server computer 820 through a keyboard 840 and a pointing device, such as a mouse 842. Other input devices (not shown) may include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The server computer 820 may operate in a networked environment using logical connections to one or more remote computers, such as a remote client computer 849. The remote computer 849 may be a workstation, a server computer, a router, a peer device or other common network node, and typically includes many or all of the elements described relative to the server computer 820, although only a memory storage device 850 is illustrated in FIG. 19. The logical connections depicted in FIG. 19 include a local area network (LAN) 851 and a wide area network (WAN) 852. Such networking environments are commonplace in offices, enterprise-wide computer networks, intranets and the Internet.

When used in a LAN networking environment, the server computer 820 is connected to the local network 851 through a network interface or adapter 853. When used in a WAN networking environment, the server computer 820 typically includes a modem 854, or is connected to a communications server on the LAN, or has other means for establishing communications over the wide area network 852, such as the Internet. The modem 854, which may be internal or external, is connected to the system bus 823 via the serial port interface 846. In a networked environment, program modules depicted relative to the server computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for fusing evidence in a decision network, the system comprising:
    memory that stores a decision network that includes a plurality of multiple layers of nodes and associated current node parameters, each node representing a given hypothesis associated with the decision network and the current node parameters comprising belief values and disbelief values in a given hypothesis; and
    a processing unit for accessing the memory and for executing executable instructions, the executable instructions comprising;
        a fusion engine algorithm that fuses new evidence with current node parameters of the decision network to provide updated current node parameters, the new evidence being new belief values and new disbelief values associated with one or more respective nodes and associated hypothesis; and
        a graphical user interface that displays the plurality of multiple layers of nodes and associated links between the plurality of multiple layers of nodes and associated current node parameters in a network view, the graphical user interface having a user override that allows a user to modify current node parameters associated with nodes and back propagate the modified node parameters through the decision network.

2. The system of claim 1, the decision network being a Dempster-Shafer belief network.

3. The system of claim 2, the fusion engine algorithm executes a Cartesian Product on current node parameters and new evidence.

4. The system of claim 1, the current node parameters being belief values, disbelief values and unknown values.

5. The system of claim 1, the new evidence being a belief value and a disbelief value relating to at least one node, the fusion engine evaluates an unknown value from the belief value and the disbelief value.

6. The system of claim 5, the sum of the belief value, the disbelief value and the unknown value being equal to one.

7. The system of claim 1, the fusion engine algorithm propagates node parameters from top layers to lower layers during initialization.

8. The system of claim 1, the graphical user interface further comprising a node override editor menu that allows a user to override current node parameters.

9. The system of claim 1, the graphical user interface further comprising an add evidence editor menu that allows a user to add evidence to current node parameters.

10. The system of claim 1, the graphical user interface further comprising a link editor menu that allows a user to modify link values associated with current node parameters of the decision network.

11. The system of claim 1, the user override allows a user to modify current node parameters of nodes in at least one of intermediate node layers and bottom node layers.

12. The system of claim 1, further comprising a second graphical user interface that provides a temporal display view of current node parameters associated with a selected node.

13. A system for comparing decision networks, the system comprising:
memory having a set of decision networks stored therein, wherein a decision network includes a plurality of multiple layers of nodes and associated node parameters, each node representing a given hypothesis associated with the decision network with node parameters comprising belief values and disbelief values in a respective hypothesis; and
a processing unit for accessing the memory and for executing executable instructions, the executable instructions comprising;
a graphical user interface that allows a user to select a first decision network and a second decision network for loading from the set of decision networks in the memory;
a loader that loads a the selected first decision network and the selected second decision network to be executed by an execution engine;
a network overlay component that compares node parameters of the first decision network and the second decision network;
an inverse execution engine algorithm that extracts node parameters from at least one node of the first decision network or the second decision network and desired node parameters comprising a desired belief value and a desired disbelief value of the at least one node and determines an inverse of the node parameters by evaluating the relationship that an evidence matrix fused with an inverse matrix produces an identity matrix and solving for the inverse matrix associated with the node parameters, the inverse matrix corresponding to an amount of evidence necessary to achieve a desired decision making threshold, the amount of evidence being a difference value between at least one of the belief value and disbelief value and at least one of the corresponding desired belief value and desired disbelief value; and
wherein the graphical user interface displays a node parameter comparison view of the first network and the second network.

14. The system of claim 13, the first decision network and the second decision network being Dempster-Shafer belief networks.

15. The system of claim 14, the network overlay component determines ratios of belief values of similar nodes of the first decision network and the second decision network, and provides the ratio to the graphical user interface, the graphical user interface displaying a comparison view of the first and second networks, wherein unmatched nodes from the first decision network and the second decision network are one of ignored or combined into other nodes.

16. A system for determining an inverse of a decision network, the system comprising:
memory that stores a Dempster-Shafer belief network with a plurality of nodes and associated node parameters, each node representing a given hypothesis associated with the decision network and the node parameters comprising belief values and disbelief values in a given hypothesis; and
a processing unit for accessing the memory and for executing executable instructions, the executable instructions comprising;
an inverse execution engine algorithm that extracts node parameters from at least one node of the Dempster-Shafer belief network and desired node parameters comprising a desired belief value and a desired disbelief value of the at least one node and determines an inverse of the node parameters by evaluating the relationship that an evidence matrix fused with an inverse matrix produces an identity matrix and solving for the inverse matrix associated with the node parameters, the inverse matrix corresponding to an amount of evidence necessary to achieve a desired decision making threshold, the amount of evidence being a difference value between at least one of the belief value and disbelief value and at least one of the corresponding desired belief value and desired disbelief value; and
a graphical user interface that displays the difference value of the at least one node and an associated linguistic term based on the difference value.

17. The system of claim 16, the node parameters being a belief value, a disbelief value and an unknown value forming a triad used in the evidence matrix, the identity matrix and the inverse matrix.

18. The system of claim 17, the inverse matrix being determined by evaluating the relationships:

$$B=-b/[(b+u)(u-bd/\{b+u\}-bd/\{d+u\})];$$

$$U=1/(u-bd/\{b+u\}-bd/\{d+u\}); \text{ and}$$

$$D=-d/[(d+u)(u-bd/\{b+u\}-bd/\{d+u\})]$$

where b is the current belief value, d is the current disbelief value and u is the unknown value of the evidence, B is the belief value, D is the disbelief value and U is the unknown value of the inverse matrix.

19. A system for fusing evidence in a decision network, the system comprising:
a memory that stores a decision network that includes a plurality of multiple layers of nodes and associated node parameters, each node representing a given hypothesis associated with the decision network and the node parameters comprising belief values and disbelief values in a given hypothesis; and a processing unit for accessing the memory and for executing executable instructions, the executable instructions comprising;

a fusion algorithm that fuses new evidence with current node parameters of the decision network to provide updated current node parameters, the new evidence being new belief values and new disbelief values associated with one or more respective nodes and associated hypothesis;

an evidence source that provides the fusion algorithm with new evidence;

a fog component algorithm that perturbs new evidence from the evidence source prior to fusing the new evidence with current node parameters by fusing perturbation variables with the new evidence; and a graphical user interface that allows a user to select a frequency associated with the perturbation variables.

20. The system of claim 19, the perturbation variables comprising data perturbation variables and human perturbation variables.

21. The system of claim 19, further comprising a graphical user interface that displays node parameters over time.

22. The system of claim 21, the decision network being a Dempster-Shafer belief network, the graphical user interface displaying a belief value, a disbelief value and an unknown value associated with a selected node.

23. A computer readable medium having computer executable instructions for performing a method, the method comprising:

retrieving a belief network from memory;

initializing the belief network with initial node parameter values to provide current node parameter values, the initial node parameter values and current node parameter values comprising belief values and disbelief values associated with a given node, the node representing a respective hypothesis;

fusing new evidence with current node parameter values to provide updated current node parameter values, the new evidence being new belief values and new disbelief values associated with one or more respective nodes and associated hypothesis;

propagating the updated current node parameter values through the belief network;

determining if a user overfire has been invoked and if at least one of the current node parameter values has been modified, wherein modifying a current node parameter values is one of overriding node parameter values, adding to node parameter values and modifying link values associated with a node;

propagating the modified current node parameters backward through the belief network if at least one of the current node parameter values has been modified;

selecting the number of layers of the network to back propagate the modified current node parameters backward through the belief network, the number of layers associated with a node layer containing the modified current node parameters; and propagating the belief network downward after propagating the network backward through the network.

24. The computer readable medium of claim 23, the belief network being a Dempster-Shafer belief network.

25. The computer readable medium of claim 23, further comprising comparing node parameter values of the belief network with node parameter values of another belief network to determine the effectiveness of one belief network with respect to the other.

26. The computer readable medium of claim 23, further comprising perturbing the new evidence prior to fusing the new evidence with the current node parameter values.

27. The computer readable medium of claim 23, further comprising graphically displaying node parameter values over time in a temporal display.

28. A computer readable medium having computer executable instructions for performing a method, the method comprising:

extracting an actual node belief value from a belief network residing in memory;

determining an inverse on the actual node belief value and a desired belief value to determine a difference node belief value corresponding to the amount of evidence necessary to achieve the desired belief value, the amount of evidence being the difference in a belief value necessary to achieve the desired belief value;

associating a linguistic term with the determined difference node belief value;

providing the difference node belief value and the associated linguistic term to a graphical user interface; and displaying the difference node belief value and the associated linguistic term via the graphical user interface on a display.

29. The computer readable medium of claim 28, the belief network being a Dempster-Shafer belief network and the inverse being determined for a disbelief value and an unknown value in addition to the belief value.

30. The computer readable medium of claim 29, the inverse being determined by evaluating the relationships:

$$B=-b/[(b+u)(u-bd/\{b+u\}-bd/\{d+u\})];$$

$$U=1/(u-bd/\{b+u\}-bd/\{d+u\}); \text{ and}$$

$$D=-d/[(d+u)(u-bd/\{b+u\}-bd/\{d+u\})]$$

where b is the current belief value, d is the current disbelief value and u is the unknown value of the evidence, B is the belief value, D is the disbelief value and U is the unknown value of the inverse matrix.

31. A system for fusing evidence in a Dempster-Shafer belief network having a plurality of node layers, the system comprising:

means for storing a Dempster-Shafer belief network having a plurality of node layers and associated node parameters, each node representing a given hypothesis associated with the decision network and associated node parameters comprising belief values and disbelief values associated with a respective hypothesis;

means for processing executable instructions and accessing the means for storing;

means for fusing new evidence with current node parameters associated with nodes of the Dempster-Shafer belief network, the new evidence being new belief values and new disbelief values associated with one or more respective nodes and associated hypothesis;

means for overriding current node parameters associated with nodes within the plurality of node layers;

means for automatically back propagating modified node parameters through the Dempster-Shafer belief network;

means for displaying the plurality of multiple layers of nodes and associated links between the plurality of multiple layers of nodes and associated node parameters in a network view;

means for degrading the current node parameters over time in the means for displaying a graphical view of current node parameters; and means for determining an inverse of current node parameters and desired node parameters to provide difference node parameters corresponding to additional evidence required to reach a decision threshold.

32. The system of claim 31, further comprising means for displaying a graphical view of current node parameters over time associated with a selected node.

33. The system of claim 31, further comprising means for overlaying node parameters of two Dempster-Shafer belief networks.

34. The system of claim 31, further comprising means for perturbing new evidence prior to fusing the evidence with the current node parameters.

* * * * *

UNITED STATES PATENT AND TRADEMARK OFFICE
CERTIFICATE OF CORRECTION

PATENT NO. : 7,424,466 B2 Page 1 of 1
APPLICATION NO. : 10/201882
DATED : September 9, 2008
INVENTOR(S) : Patrick J. Talbot et al.

It is certified that error appears in the above-identified patent and that said Letters Patent is hereby corrected as shown below:

Column 19, line 47, after "user" delete "overfire" and insert --override--

Signed and Sealed this

Eleventh Day of November, 2008

JON W. DUDAS
*Director of the United States Patent and Trademark Office*